United States Patent
Arai

(10) Patent No.: US 9,251,450 B2
(45) Date of Patent: Feb. 2, 2016

(54) IMAGE PROCESSING SYSTEM AND METHOD OF PRINT JOB FOR EXECUTING PRINT PROCESS IN NORMAL AND SECURE MODE AND CREATES PRINT JOB CANCELLATION LOG

(71) Applicant: Oki Data Corporation, Tokyo (JP)

(72) Inventor: Taiki Arai, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/949,287

(22) Filed: Jul. 24, 2013

(65) Prior Publication Data

US 2014/0036297 A1 Feb. 6, 2014

(30) Foreign Application Priority Data

Aug. 1, 2012 (JP) ................................. 2012-171159

(51) Int. Cl.
  *G06K 15/00* (2006.01)
  *G06F 3/12* (2006.01)

(52) U.S. Cl.
  CPC .......... *G06K 15/4095* (2013.01); *G06F 3/1222* (2013.01); *G06F 3/1238* (2013.01); *G06F 3/1267* (2013.01); *G06F 3/1285* (2013.01); *G06F 3/1274* (2013.01)

(58) Field of Classification Search
  None
  See application file for complete search history.

(56) References Cited

U.S. PATENT DOCUMENTS

| 2002/0027673 | A1 | 3/2002 | Roosen et al. |
| 2005/0100378 | A1* | 5/2005 | Kimura et al. ................. 400/76 |
| 2006/0187481 | A1* | 8/2006 | Hayakawa .................... 358/1.14 |
| 2008/0309984 | A1* | 12/2008 | Minami et al. ............... 358/301 |
| 2009/0073483 | A1* | 3/2009 | Oomori ....................... 358/1.14 |
| 2010/0007907 | A1* | 1/2010 | Aikens et al. ................ 358/1.14 |
| 2011/0317203 | A1* | 12/2011 | Mizutani et al. ............. 358/1.14 |

FOREIGN PATENT DOCUMENTS

| JP | 07-079298 A | 3/1995 |
| JP | 10-079863 | 3/1998 |
| JP | 2003-196050 A | 7/2003 |
| JP | 2003-326777 A | 11/2003 |
| JP | 2008-211646 A | 9/2008 |
| JP | 2008-217349 A | 9/2008 |
| JP | 2009-301421 A | 12/2009 |

* cited by examiner

*Primary Examiner* — Benny Q Tieu
*Assistant Examiner* — Haris Sabah
(74) *Attorney, Agent, or Firm* — Rabin & Berdo, P.C.

(57) ABSTRACT

An image processing apparatus includes a determination unit that determines whether a print job received from outside is a normal print job or an authentication print job, and a control unit. When the determination unit determines that the received print job is the authentication print job, the control unit executes authentication print processing based on the received authentication print job. When the determination unit determines that the received print job is the normal print job, the control unit executes authentication print processing based on the received normal print job instead of executing normal print processing.

16 Claims, 19 Drawing Sheets

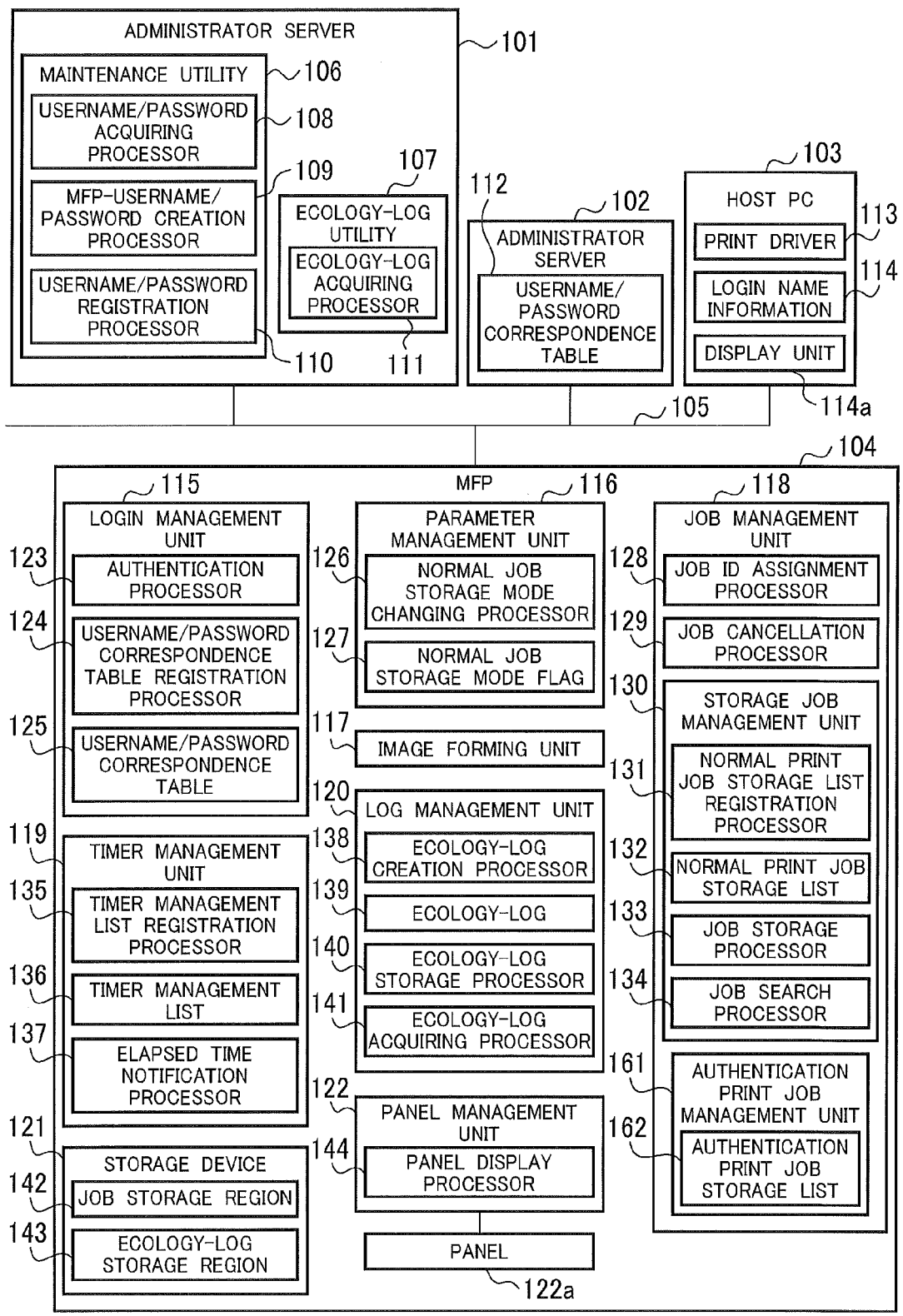

| USERNAME | PASSWORD |
|---|---|
| XXX Taro | xxxxxx |
| XXX Jiro | yyyyyy |
| XXX Sanro | zzzzzz |
| ... | ... |

| PINID | USERNAME | PASSWORD |
|---|---|---|
| 1 | XXX Taro | xxxxxx |
| 2 | XXX Jiro | yyyyyy |
| 3 | XXX Sanro | zzzzzz |
| ... | ... | ... |

FIG. 4

| PARAMETER | FLAG | DESCRIPTION |
|---|---|---|
| NORMAL JOB STORAGE MODE | OFF | EXECUTE PRINTING OF NORMAL PRINT JOB WITHOUT STORING NORMAL PRINT JOB |
|  | ON | STORE NORMAL PRINT JOB |

| PARAMETER | FLAG |
|---|---|
| NORMAL JOB STORAGE MODE | OFF |

| PARAMETER | FLAG |
|---|---|
| NORMAL JOB STORAGE MODE | ON |

| JOB ID | JOB NAME |
|---|---|
| 33 | NORMAL PRINT JOB |

| JOB ID | USERNAME (PASSWORD) | JOB STORAGE LOCATION | RECEPTION DATE/TIME |
|---|---|---|---|
| 11 | XXX Jiro | JOB STORAGE REGION | xxxx (YEAR), xx (MONTH), xx (DATE), xx : xx (TIME) |
| 22 | XXX Sanro | JOB STORAGE REGION | xxxx (YEAR), xx (MONTH), xx (DATE), xx : xx (TIME) |
|  |  |  |  |

| JOB ID | USERNAME (PASSWORD) | JOB STORAGE LOCATION | RECEPTION DATE/TIME |
|---|---|---|---|
| 11 | XXX Jiro | JOB STORAGE REGION | xxxx (YEAR), xx (MONTH), xx (DATE), xx : xx (TIME) |
| 22 | XXX Sanro | JOB STORAGE REGION | xxxx (YEAR), xx (MONTH), xx (DATE), xx : xx (TIME) |
| 33 | XXX aro | JOB STORAGE REGION | xxxx (YEAR), xx (MONTH), xx (DATE), xx : xx (TIME) |

| JOB ID | MONITORING TIME |
|---|---|
| 11 | 30 MINUTES |
| 22 | 60 MINUTES |
|  |  |

| JOB ID | MONITORING TIME |
|---|---|
| 11 | 30 MINUTES |
| 22 | 60 MINUTES |
| 33 | 15 MINUTES |

FIG. 12

| JOB ID | REASON |
|---|---|
| 33 | 15 MINUTES ELAPSED |

| CANCELED TIME | USERNAME | SAVED PRINTING NUMBER |
|---|---|---|
| 2011/9/1 | XXX Taro | 10 |

USERNAME: XXX Taro — 1402

AUTOMATIC CANCELLATION TIME : 15 MINUTES — 1403

PRINT DATA : 10 PAGES — 1404

| JOB ID | JOB NAME |
|---|---|
| 44 | NORMAL PRINT JOB |

| JOB ID | USERNAME (PASSWORD) | JOB STORAGE LOCATION | RECEPTION DATE/TIME | IP ADDRESS |
|---|---|---|---|---|
| 11 | XXX Jiro | JOB STORAGE REGION | xxxx (YEAR), xx (MONTH), xx (DATE), xx : xx (TIME) | 10.49.133.121 |
| 22 | XXX Sanro | JOB STORAGE REGION | xxxx (YEAR), xx (MONTH), xx (DATE), xx : xx (TIME) | 10.49.133.140 |
| | | | | |

| JOB ID | USERNAME (PASSWORD) | JOB STORAGE LOCATION | RECEPTION DATE/TIME | IP ADDRESS |
|---|---|---|---|---|
| 11 | XXX Jiro | JOB STORAGE REGION | xxxx (YEAR), xx (MONTH), xx (DATE), xx : xx (TIME) | 10.49.133.121 |
| 22 | XXX Sanro | JOB STORAGE REGION | xxxx (YEAR), xx (MONTH), xx (DATE), xx : xx (TIME) | 10.49.133.140 |
| 44 | XXX Taro | JOB STORAGE REGION | xxxx (YEAR), xx (MONTH), xx (DATE), xx : xx (TIME) | 10.49.133.157 |
| | | | | |

| JOB ID | MONITORING TIME | STATE |
|---|---|---|
| 11 | 30 MINUTES | BEING MONITORED |
| 22 | 60 MINUTES | BEING MONITORED |
| | | |

| JOB ID | MONITORING TIME | STATE |
|---|---|---|
| 11 | 30 MINUTES | BEING MONITORED |
| 22 | 60 MINUTES | BEING MONITORED |
| 44 | 15 MINUTES | BEING MONITORED |
| | | |

| CANCELED TIME | JOB ID | ID ADDRESS | USERNAME | RESULT | REASON |
|---|---|---|---|---|---|
| 2011/9/1 | 33 | 10.49.133.157 | XXX Taro | CANCELLED | TIME ELAPSED |

IMAGE PROCESSING SYSTEM AND METHOD OF PRINT JOB FOR EXECUTING PRINT PROCESS IN NORMAL AND SECURE MODE AND CREATES PRINT JOB CANCELLATION LOG

BACKGROUND OF THE INVENTION

The present invention relates to an image processing apparatus, an image processing system and a management method of print job.

In a general image forming system (i.e., an image processing system), when an image forming apparatus (i.e., an image processing apparatus) receives an authentication print job (i.e., a print job having instruction to execute an authentication printing), the image forming apparatus does not immediately print an image, but stores the authentication print job therein. When a user goes to the image forming apparatus and inputs a password assigned to the authentication print job, the image forming apparatus prints the image.

An example of such an image forming system is disclosed in Japanese Laid-open Patent Publication No. 2009-301421 (see, for example, paragraphs 0081 through 0106 and FIG. 10).

However, the general image forming system does not provide sufficient convenience in printing of the normal print job.

SUMMARY OF THE INVENTION

An aspect of the present invention is intended to provide an image processing apparatus, an image processing system and a management method of a print job capable of enhancing convenience in printing of a normal print job.

According to an aspect of the present invention, there is provided an image processing apparatus including a determination unit that determines whether a print job received from outside is a normal print job or an authentication print job, and a control unit. When the determination unit determines that the received print job is the authentication print job, the control unit executes authentication print processing based on the received authentication print job. When the determination unit determines that the received print job is the normal print job, the control unit executes authentication print processing based on the received normal print job instead of executing normal print processing.

With such a configuration, it becomes possible to enhance convenience in printing of a normal print job.

According to another aspect of the present invention, there is provided a managing method of print job. The managing method includes determining whether a print job received from outside is a normal print job or an authentication print job, executing authentication print processing based on the received print job, when the received print job is the authentication print job, and executing authentication print processing based on the received print job instead of executing normal print processing, when the received print job is the normal print job.

According to still another aspect of the present invention, there is provided an image processing system including an image processing apparatus and an information processing apparatus. The information processing apparatus includes an information processing control unit that receives setting of a job cancellation time and creates information on a job cancellation time. The information processing control unit creates a print job including the information on the job cancellation time, user identification information and image data. The information processing control unit sends the print job to the image processing apparatus. The image processing apparatus includes a determination unit that determines whether the print job sent from the information processing apparatus is a normal print job or an authentication print job, and a control unit. When the determination unit determines that the received print job is the authentication print job, the control unit executes authentication print processing based on the received authentication print job. When the determination unit determines that the received print job is the normal print job, the control unit executes authentication print processing based on the received normal print job instead of executing normal print processing. The control unit cancels the received print job based on the information on the job cancellation time included in the received print job and an elapsed time after the print job is received.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIG. 1 is a block diagram showing a configuration of an image forming system according to the first embodiment;

FIG. 2 is an explanatory view of a username/password correspondence table held by an authentication server according to the first embodiment;

FIG. 3 is an explanatory view of a username/password correspondence table for an MFP according to the first embodiment;

FIG. 4 is an explanatory view of a normal print job storage mode according to the first embodiment;

FIG. 5 is an explanatory view of the normal print job storage mode according to the first embodiment;

FIG. 6 is an explanatory view of the normal print job storage mode according to the first embodiment;

FIG. 7 is an explanatory view of a job ID assigned to a normal print job according to the first embodiment;

FIG. 8 is an explanatory view of a normal print job storage list according to the first embodiment;

FIG. 9 is an explanatory view of the normal print job storage list according to the first embodiment;

FIG. 10 is an explanatory view of a timer management list according to the first embodiment;

FIG. 11 is an explanatory view of the timer management list according to the first embodiment;

FIG. 12 is an explanatory view of an elapsed time notification according to the first embodiment;

FIG. 13 is an explanatory view of an ecology-log according to the first embodiment;

FIG. 14 is an explanatory view of the normal print job according to the first embodiment;

FIG. 26 is an explanatory view of a job ID assigned to a normal print job according to the second embodiment;

FIG. 27 is an explanatory view of a normal print job storage list according to the second embodiment;

FIG. 28 is an explanatory view of the normal print job storage list according to the second embodiment;

FIG. 29 is an explanatory view of a timer management list according to the second embodiment;

FIG. 30 is an explanatory view of the timer management list according to the second embodiment;

FIG. 31 is an explanatory view of an ecology-log according to the second embodiment;

DETAILED DESCRIPTION OF THE PREFERRED EMBODIMENT

Figure 15:
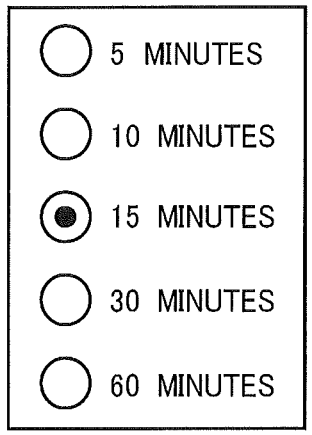
FIG. 15 is an explanatory view of tabs for selecting an automatic cancellation time according to the first embodiment.

Hereinafter, embodiments of the present invention will be described with reference to drawings. The drawings are provided for illustrative purpose and are not intended to limit the scope of the present invention.

First Embodiment

A configuration of the first embodiment of the present invention will be described with reference to FIGS. 1 through 17. FIG. 1 is a block diagram showing a configuration of an image forming system (i.e., an image processing system) according to the first embodiment of the present invention.

In FIG. 1, the image forming system of the first embodiment includes an administrator server 101, an authentication server 102, a host PC (personal computer) 103, and an MFP (multifunction peripheral) 104. The host PC 103 (i.e., a host device) creates a print job. The MFP 104 (i.e., an image processing apparatus or an image forming apparatus) receives the print job from the host PC 103 and forms an image. The administrator server 101, the authentication server 102, the host PC 103 and the MFP 104 are communicably connected with each other via a network 105 as a communication unit. The number of MFP 104 is not limited to one, but two or more MFPs 104 can be provided.

Each of the administrator server 101, the authentication server 102, the host PC 103 and the MFP 104 has a control unit such as a CPU (central processor) and a storage unit such as a memory. Each control unit controls an entire operation of the corresponding device based on a control program stored in the storage unit.

The administrator server 101 is a server that manages (controls) the MFP 104. The administrator server 101 includes a maintenance utility 106 and an ecology-log utility 107. The administrator server 101 acquires a username/password correspondence table 112 (i.e., a correspondence table of usernames and passwords) from the authentication server 102, and registers the correspondence table 112 to the MFP 104.

The maintenance utility 106 includes a username/password acquiring processor 108, an MFP-username/password creation processor 109, and a username/password registration processor 110.

The username/password acquiring processor 108 executes processing to acquire the username/password correspondence table 112 that the authentication server 102 stores in the storage unit. FIG. 2 is an explanatory view of the username/password correspondence table 112. The username/password correspondence table 112 is a table in which usernames and passwords are associated with each other as shown in FIG. 2.

The MFP-username/password creation processor 109 executes processing to create a username/password correspondence table 125 for the MFP 104 based on the username/password correspondence table 112 acquired from the authentication server 102. FIG. 3 is an explanatory view of the username/password correspondence table 125 for the MFP 104. The username/password correspondence table 125 for the MFP 104 is a table in which PINIDs (i.e., Personal Identification Number IDs), the usernames and the passwords are associated with one another.

The username/password registration processor 110 executes processing to register the created username/password correspondence table 125 for the MFP 104 to the MFP 104.

The ecology-log utility 107 includes an ecology-log acquiring processor 111. The ecology-log utility 107 acquires an ecology-log 139 from the MFP 104, when a normal job storage mode flag 127 (described later) is ON and when a stored print job is cancelled. The ecology-log acquiring processor 111 executes processing to acquire and collect the ecology-log 139 stored and accumulated in the MFP 104.

The authentication server 102 is a server used when a user logs in the host PC 103. The authentication server 102 is configured to hold the username/password correspondence table 112 shown in FIG. 2.

The host PC 103 (i.e., an information processing unit) creates a normal print job 1401 described later, and sends the normal print job 1401 to the MFP 104. The host PC 103 includes a print driver 113, login-name information 114, and a display unit 114a. The host PC 103 cooperates with the authentication server 102, and determines whether or not to allow the user to log in the host PC 103 by referring to the authentication server 102.

In this regard, the "normal print job" is a print job that does not have an instruction of authentication printing. In contrast, the "authentication print job" is a print job having an instruction of the authentication printing.

The print driver 113 (i.e., an information processing control unit or a print instruction unit) is a print driver software that creates the normal print job 1401 including a username, print data and an automatic cancellation time (i.e., a job cancellation time), and sends the normal print job 1401 to the MFP 104.

The login-name information 114 is information on the username which was used when the user logged in the host PC 103. The login-name information 114 is used to create the normal print job 1401.

The MFP 104 is a device having functions of copying, facsimile, printing, scanning and the like. The MFP 104 includes a login management unit 115, a parameter management unit 116, an image forming unit 117, a job management unit 118, a timer management unit 119, a log management unit 120, a storage device 121 and a panel management unit 122.

The login management unit 115 (i.e., an identification information reception unit or an authentication management unit) receives input of the username, and executes authentication of the user (i.e., personal authentication) for the MFP 104. The login management unit 115 includes an authentication processor 123, a username/password correspondence table registration processor 124 and the username/password correspondence table 125.

The authentication processor 123 executes processing to determine whether or not to allow the user to log in the MFP 104 based on the registered username/password correspondence table 125. The username/password correspondence table registration processor 124 executes processing to register the username/password correspondence table 125 to the storage unit.

The username/password correspondence table 125 includes the usernames and passwords of users of the respective MFP 104. The username/password correspondence table 125 is used in the authentication of the user. As described above, the username/password correspondence table 125 includes the PINIDs, the usernames and the passwords as shown in FIG. 3. In this regard, the PINID (i.e., Personal Identification Number ID) is an identification number used by the MFP 104 to identify users.

The parameter management unit 116 (i.e., a mode management unit or a storage instruction management unit) manages settings of the MFP 104. The parameter management unit 116 includes a normal job storage mode changing processor 126 and a normal job storage mode flag 127. The normal job storage mode changing processor 126 executes processing to change the normal job storage mode flag 127.

When the MFP 104 receives the normal print job 1401 from the host PC 103, the normal job storage mode flag 127 is used as information (i.e., parameter) to determine whether the MFP 104 stores the normal print job 1401 (received from the host PC 103) in the storage unit or executes printing without storing the normal print job 1401. FIG. 4 is an explanatory view of the normal job storage mode flag 127.

In this regard, when the normal job storage mode flag 127 is OFF (for example, 0), the MFP 104 executes printing without storing the normal print job 1401. More specifically, when the MFP 104 receives the normal print job 1401, the MFP 104 causes the image forming unit 117 to form (print) an image on a medium according to the normal print job 1401 without waiting for a user's operation. This is referred to a second mode (i.e., an operation mode).

In contrast, when the normal job storage mode flag 127 is ON (for example, 1), the MFP 104 stores the normal print job 1401 in the storage unit. More specifically, when the MFP 104 receives the normal print job 1401, the MFP 104 stores the normal print job 1401 in the storage unit, and waits for a user's operation. When the MFP 104 receives the user's operation, the MFP 104 reads out the normal print job 1401 (which has been stored in the storage unit) from the storage unit, and causes the image forming unit 117 to form the image on the medium according to the normal print job 1401 which has been read. This is referred to a first mode (i.e., the operation mode).

The normal job storage mode flag 127 is set to OFF as shown in FIG. 5 before setup processing of the MFP 104. The normal job storage mode flag 127 is set to ON as shown in FIG. 6 after the setup processing of the MFP 104.

In this embodiment, the parameter management unit 116 (i.e., the storage instruction management unit) stores the normal job storage mode flag 127 that serves as information (i.e., a storage instruction) instructing to store all of the received print jobs.

The image forming unit 117 is configured to print an image (i.e., print data) of the print job that the MFP 104 receives. The image forming unit 117 includes a feeding cassette storing media (for example, papers), and feeds each medium along a feeding path toward an image forming portion. The image forming portion includes a photosensitive drum (i.e., an image bearing body), a charging member, an exposure unit, a developing unit, and a transfer member. The charging member uniformly charges the surface of the photosensitive drum, and the exposure unit emits light to expose the surface of the photosensitive drum so as to form a latent image. The developing unit develops the latent image with toner (i.e., developer) to form a toner image (i.e., a developer image). The transfer member transfers the toner image from the photosensitive drum to the medium. A fixing unit fixes the toner image to the medium, and an ejection unit ejects the medium outside the MFP 104.

The job management unit 118 (i.e., a control unit) is configured to entirely manage the print jobs received by the MFP 104. The job management unit 118 includes a job ID assignment processor 128, a job cancellation processor 129, a storage job management unit 130, and an authentication print job management unit 161.

The job ID assignment processor 128 executes processing to assign a unique ID (identifier) to each of the print jobs received by the MFP 104. The ID assigned to each print job is referred to as a job ID. FIG. 7 is an explanatory view of the job ID assigned to the print job. As shown in FIG. 7, for example, the job ID of "33" is assigned to the normal print job 1401.

The job cancellation processor 129 (i.e., a job cancellation processing unit) executes processing to cancel (delete) the print job that has been input into the MFP 104.

The storage job management unit 130 (i.e., a determination unit) is configured to temporarily store all of the print jobs (including the normal print jobs having no instruction of authentication printing) which are to be stored according to the normal job storage mode flag 127 in the storage unit. The storage job management unit 130 includes a normal print job storage list registration processor 131, a normal print job storage list 132, a job storage processor 133, and a job search processor 134.

The normal print job storage list registration processor 131 executes processing to register the job IDs, the usernames (passwords), storage locations (i.e., job storage locations) and reception dates/times of the print jobs (which are to be stored according to the normal job storage mode flag 127) to the normal print job storage list 132.

The normal print job storage list 132 is a group of information on the print jobs stored in the storage unit of the MFP 104. FIG. 8 is an explanatory view of the normal print job storage list 132. As shown in FIG. 8, the normal print job storage list 132 includes the job IDs, the usernames (passwords), the job storage locations and the reception dates/times of the print jobs. FIG. 9 shows a state where the print job having the job ID of "33", the username (password) of "XXX Taro", the job storage location of "job storage region", and the reception date/time of "XXXX (year), XX (month), XX (day), XX:XX (time)" is added to the normal print job storage list 132 of FIG. 8.

The job storage processor 133 executes processing to store the received print job in a job storage region 142 (i.e., the storage unit) of the storage device 121. The job storage region 142 is also referred to as a normal print job storage unit and an authentication print job storage unit.

The job search processor 134 executes processing to search the normal print job storage list 132 based on the designated job ID and the username (password).

With such a configuration, the job management unit 118 stores all of the print jobs which are received according to the normal job storage mode flag 127 of "ON" in the storage unit. Further, when the login management unit 115 receives input of the username, the job management unit 118 searches the print jobs of the normal print job storage list 132 stored in the storage unit based on the username for which the personal authentication is completed by the login management unit 115, and finds the print job including the username. In contrast, when the normal job storage mode flag 127 is set to "OFF", the job management unit 118 executes reception of the normal print job without storing the normal print job in the storage unit and without executing the personal authentication.

The image forming unit 117 forms (i.e., prints) an image of the print data included in the print job found by the job management unit 118.

When the job management unit 118 receives (at the panel management unit 122) an instruction to cancel the printing of the print job, the job management unit 118 deletes the print job from the job storage region 142 of the storage device 121 and from the normal print job storage list 132 without causing the image forming unit 117 to execute printing.

The timer management unit 119 (i.e., the elapsed time management unit) is configured to check whether an elapsed time after the print job is received by the MFP 104 exceeds the automatic cancellation time included in the print job. The timer management unit 119 executes this checking for each of the print jobs. The timer management unit 119 includes a timer management registration processor 135, a timer management list 136 and an elapsed time notification processor 137.

The timer management registration processor 135 registers the job ID (designated by the print job) and a monitoring time (i.e., the automatic cancellation time) in the timer management list 136, and updates the job ID and the monitoring time in the timer management list 136.

The timer management list 136 is a group of information, i.e., a list of the print jobs whose elapsed times are being monitored. FIG. 10 is an explanatory view of the timer management list 136. As shown in FIG. 10, the timer management list 136 includes the job IDs and the monitoring times. FIG. 11 shows a state where the print job having the job ID of "33" and the monitoring time of "15 minutes" is added to the timer management list 136.

The elapsed time notification processor 137 extracts information on the print job whose designated time (designated by the print job) has elapsed from the timer management list 136, and notifies the job management unit 118 of the extracted information. FIG. 12 is an explanatory view of an elapsed time notification. As shown in FIG. 12, the elapsed time notification outputted by the elapsed time notification processor 137 to the job management unit 118 includes the job ID and a reason.

The job management unit 118 that receives the elapsed time notification does not cause the image forming unit 117 to print the print job whose job ID is designated by the elapsed time notification, but deletes the print job from the job storage region 142 and from the normal print job storage list 132.

The log management unit 120 (i.e., a saved printing number management unit) acquires a saved printing number (i.e., the number of printing media on which printing is not executed in the normal print job 1401) from the print data in the normal print job 1401, when the stored normal print job 1401 is deleted from the storage unit without being printed by the image forming unit 117. The log management unit 120 creates the ecology-log 139 including the saved printing number (acquired from the print data in the normal print job 1401), and stores the ecology-log 139 in the storage unit. The log management unit 120 includes an ecology-log creation processor 138, the ecology-log 139, an ecology-log storage processor 140, and an ecology-log acquiring processor 141.

The ecology-log creation processor 138 (i.e., a log creation unit) executes processing to create the ecology-log 139 based on the number of media (sheets) of the print data included in the cancelled print job, when the print job is cancelled.

The ecology-log 139 is a log (i.e., information) created by the ecology-log creation processor 138. FIG. 13 is an explanatory view of the ecology-log 139. As shown in FIG. 13, the ecology-log 139 includes a cancelled time, the username, and the saved printing number (i.e., the saved number of printing media). That is, the ecology-log 139 is a log regarding the print job which is cancelled for the reason that the normal job storage mode flag 127 of the print job is ON.

The ecology-log storage processor 140 executes processing to store the ecology-log 139 in an ecology-log storage region 143 of the storage device 121.

The ecology-log acquiring processor 141 execute processing to acquire the ecology-log 139 stored in the ecology storage region 143 of the storage device 121.

The storage device 121 (i.e., the storage unit) is a nonvolatile memory device such as an HDD (Hard Disc Drive) or a memory card. The storage device 121 includes a job storage region 142 and an ecology storage region 143.

The job storage region 142 is a region for storing the print job received by the MFP 104. The ecology storage region 143 is a region for storing the ecology-log 139.

The panel management unit 122 is configured to display information on a panel 122a for enabling the user to operate the MFP 104, and configured to receive a user's operation. The panel management unit 122 includes a panel display processor 144 (i.e., a job cancellation instruction reception unit).

The panel display processor 144 displays various kinds of information to prompt the user to operate, and executes processing to receive the user's operation. The panel display processor 144 can display a before-login panel display (FIG. 16) and an after-login panel display (FIG. 17) described later.

FIG. 14 is an explanatory view of the normal print job according to the first embodiment.

As shown in FIG. 14, the normal print job 1401 includes an execution username 1402, an automatic cancellation time 1403 and print data 1404. FIG. 14 shows the normal print job 1401 created when the user "XXX Taro" executes printing on 10 pages while setting the automatic cancellation time to 15 minutes.

In the execution user name 1402, a username of the user who is going to execute the print job is stored. In the automatic cancellation time 1403, a time (i.e., an automatic cancellation time) to automatically cancel the print job if the normal print job is not printed until a designated time elapses is stored. The automatic cancellation time 1403 is set using a setting screen as shown in FIG. 15 described later. The print data 1404 is print data which is to be printed according to the normal print job.

FIG. 15 is an explanatory view of tabs (i.e., automatic cancellation time selection tabs) of the first embodiment for selecting the automatic cancellation time 1403. The automatic cancellation time selection tabs are displayed on the display unit 114*a* of the host PC 103 when the user is going to set the automatic cancellation time during the creation of the normal print job 1401. That is, the automatic cancellation time selection tabs are displayed when printing is executed using the print driver 113 of the host PC 103.

The automatic cancellation time selection tabs allow the user to select the automatic cancellation time among, for example, 5, 10, 15, 30 and 60 minutes. When the user selects the automatic cancellation time and operates to execute printing, the normal print job 1401 is created. The automatic cancellation time selected by the user is set to the automatic cancellation time 1403.

Figure 16:
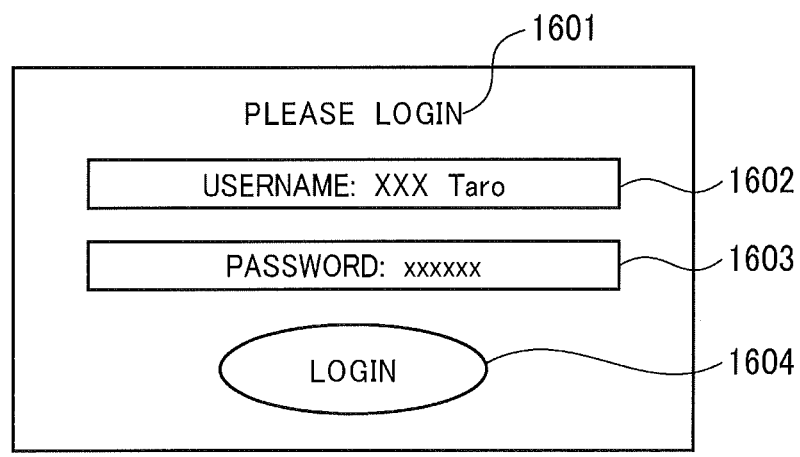
FIG. 16 is an explanatory view of a before-login panel display according to the first embodiment.

FIG. 16 is an explanatory view of the before-login panel display of the first embodiment. The before-login panel display of FIG. 16 is displayed on the MFP 104. FIG. 16 shows a state where the user inputs its username and password in the before-login panel display.

The before-login panel display includes a display statement 1601, a username 1602, a password 1603 and a login button 1604.

The display statement 1601 is a statement to prompt the user to log in the MFP 104. The username 1602 is a region for inputting the username when the user logs in the MFP 104. The password 1603 is a region for inputting the password when the user logs in the MFP 104. The login button 1604 is a button to execute login processing. When the login button 1604 is pressed, the authentication processor 123 of the login management unit 115 executes processing to determine whether or not to allow the user to log in the MFP 104. In an example shown in FIG. 16, the display statement 1601 states "Please log in".

Figure 17:
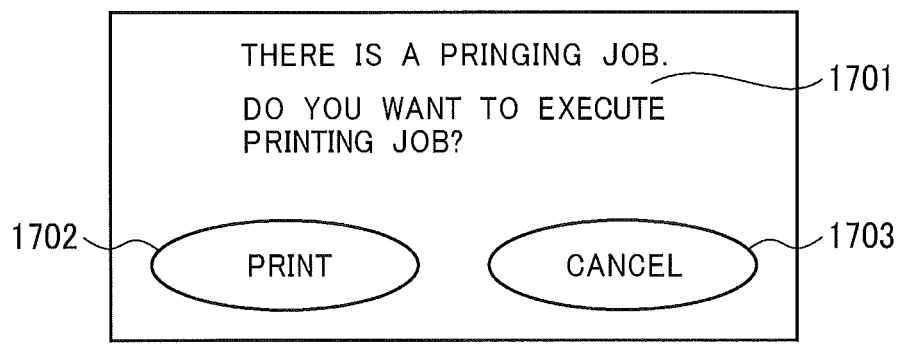
FIG. 17 is an explanatory view of a after-login panel display according to the first embodiment.

FIG. 17 is an explanatory view of the after-login panel display of the first embodiment. The after-login panel display of FIG. 17 is displayed on the MFP 104. The after-login panel display is displayed when the print jobs of the normal print job storage list 132 are searched and the print job assigned to the username (of the user who logs in the MFP 104) is found. The after-login panel display is not displayed when there exists no print job assigned to the username of the user who logs in the MFP 104.

The after-login panel display includes a display statement 1701, a printing button 1702 and a canceling button 1703.

The display statement 1701 is a statement to prompt the user to execute or cancel printing. The printing button 1702 is a button to execute the printing of the print job. When the printing button 1702 is pressed, the image forming unit 117 executes printing. The canceling button 1703 is a button to cancel the print job. When the cancelling button 1703 is pressed, the print job is cancelled. In an example shown in FIG. 17, the display statement 1701 states "There is a print job." and asks "Do you want to execute printing?".

An operation of the image forming system having the above described configuration will be described with reference to FIGS. 18 through 24 as well as FIGS. 1 and 14.

First, main processing executed by the image forming system of the first embodiment will be described with reference to FIG. 18. The storage job management unit 130 of the MFP 104 checks whether the received print job (sent from the host PC 103) is a normal print job or an authentication print job based on information included in the received print job. Here, it is assumed that the print job is not the authentication print job, but is the normal print job.

Figure 18:
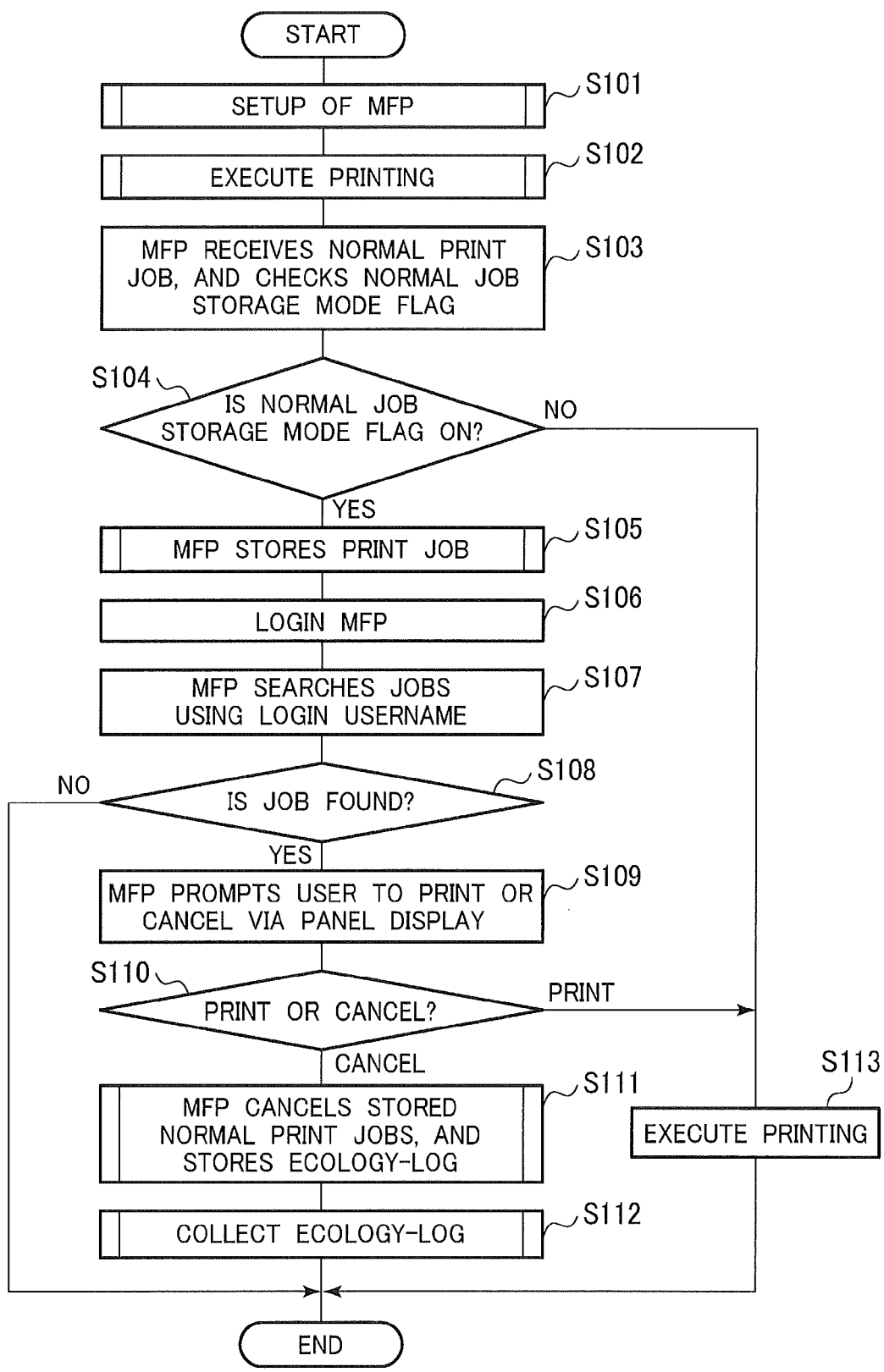
FIG. 18 is a flowchart showing main processing according to the first embodiment.

FIG. 18 is a flowchart showing the main processing executed by the image forming system of the first embodiment. In step S101, the MFP 104 receives an operation of an administrator of the image forming system, and executes setup processing of the MFP 104 so that the user can use the MFP 104. Detail description of the setup processing will be made later.

In step S102, the host PC 103 receives the user's operation to log in the host PC 103, and receives the user's operation to execute print execution processing (i.e., to execute printing using the print driver 113). The normal print job is sent to the MFP 104. Detailed description of the print execution processing will be made later.

In step S103, the MFP 104 receives the normal print job 1401 sent from the host PC 103, and proceeds to check the normal job storage mode flag 127.

In step S104, the MFP 104 checks whether the normal job storage mode flag 127 is ON or OFF. If the normal job storage mode flag 127 is ON, the MFP 104 proceeds to step S105. If the normal job storage mode flag 127 is OFF, the MFP 104 proceeds to step S113 without storing the normal print job 1401.

In step S105, the MFP 104 (having determined that the normal job storage mode flag 127 is ON) executes normal print job storage processing to store the received normal print job 1401. Detailed description of the normal print job storage processing will be made later.

In step S106, the MFP 104 receives the username and the password input by the user when the user logs in the MFP 104. Here, the normal print job 1401 sent from host PC 103 is stored in the MFP 104, and the user goes to the MFP 104 to log in the MFP 104. For example, the user inputs "XXX Taro" in the username 1602 and "xxxxxx" in the password 1603 of the panel display shown in FIG. 16.

The MFP 104 causes the authentication processor 123 to determine whether or not to allow the user to log in the MFP 104. In this example, the username "XXX Taro" and the password "xxxxxx" exist in the username/password correspondence table 125, and therefore the user is allowed to log in the MFP 104.

In step S107, the MFP 104 causes the job search processor 134 to search the normal print job storage list 132 using the username of the user who logs in the MFP 104.

In step S108, the MFP 104 checks whether the normal print job 1401 exists in the normal print job list 132. If the MFP 104 finds the normal print job 1401 in the normal print job list 132, the MFP 104 proceeds to step S109. If the MFP 104 does not find the normal print job 1401 in the normal print job list 132, the main processing is terminated.

In step S109, the MFP 104 (having found the normal print job 1401 in the normal print job list 132) displays the panel display (see FIG. 17) to prompt the user to select whether to execute or cancel the printing of the normal print job 1401.

In step S110, the MFP 104 determines whether the user selects execution or cancellation of the printing of the normal print job 1401. If the user selects execution of the printing of the normal print job 1401, the MFP 104 proceeds to step S113. If the user selects cancellation of the printing of the normal print job 1401, the MFP 104 proceeds to step S111.

In this regard, if there are plural normal print jobs 1401, the MFP 104 prompts the user to select whether to execute or cancel the printing of all of the normal print jobs 1401.

In step S111, the MFP 104 (having determined that the user selects the cancellation of the printing of the normal print job 1401) cancels the printing of the normal print job 1401, and executes ecology-log storage processing to create and store the ecology-log 139. Description of the ecology-log storage processing will be made later.

In this regard, if there are plural normal print jobs 1401 cancelled by the user, the MFP 104 cancels printings of these normal print jobs 1401, and creates and stores the ecology-logs 139.

In step S112, the administrator server 101 receives the administrator's operation, and executes ecology-log collection processing to collect the ecology-logs 139 which are created and stored upon cancellation of the normal print jobs 1401.

Based on the ecology-log 139, the administrator can confirm the number of printings saved by cancellation of the normal print jobs. Detailed description of the ecology-log collection processing will be made later.

In step S113, the MFP 104 instructs the image forming unit 117 to execute the printing, and the image forming unit 117 executes the printing of the normal print job 1401. Then, the main processing is terminated.

As above, when the normal job storage mode flag 127 is set to "ON" in the MFP 104, the MFP 104 does not print the print job (sent from the host PC 103), but stores the print job in the storage unit. The stored print job is printed when the authentication of the user is completed based on the user's operation. Therefore, it becomes possible to reduce a possibility that the printed medium is left behind on the MFP 104. That is, leakage of information to a third person can be prevented. Thus, convenience in printing of the normal print job can be enhanced.

Further, since the print job stored in the MFP 104 can be cancelled before printing, it becomes possible to reduce wasteful printing due to an operation error at the host PC 103.

Here, processing when the print job is the authentication print job will be described.

The "authentication printing" is carried out by comparing the username (i.e., identification information of the user) and the password included in the authentication print job respectively with the username and password input by the user via the panel 122*a*, and executing printing when the usernames and the passwords are respectively coincident with each other. When the usernames and/or passwords are not coincident with each other, the printing is not executed (or is limited).

In FIG. 1, the authentication print job management unit 161 of the job management unit 118 includes an authentication print job storage list 162. As described above, the storage job management unit 130 of the MFP 104 determines whether the received print job is the authentication print job or the normal print job, based on information (i.e., an identifier of the authentication print job) included in the print job. When it is determined that the received print job is the authentication print job, the authentication print job management unit 161 stores the authentication print job in the storage unit (irrespective of the value of the normal job storage mode flag 127), and stores information on the authentication print job (stored in the storage unit) in the authentication print job storage list 162.

When the job search processor 134 searches the normal print job storage list 132 using the username of the user who logs in the MFP 104 as described above, the authentication print job management unit 161 searches the authentication print job storage list 162 using the same username. In this regard, the MFP 104 does not automatically delete the authentication print job in automatic cancellation processing described later.

Further, the MFP 104 does not execute ecology-log storage processing when the authentication printing job is cancelled by the user's operation before printing.

Optionally, the MFP 104 may execute the ecology-log storage processing (according to setting) when the authentication print job is cancelled before printing. In this case, the ecology-log 139 is added with information for distinguishing whether the print job is the normal print job or the authentication print job.

Figure 19:
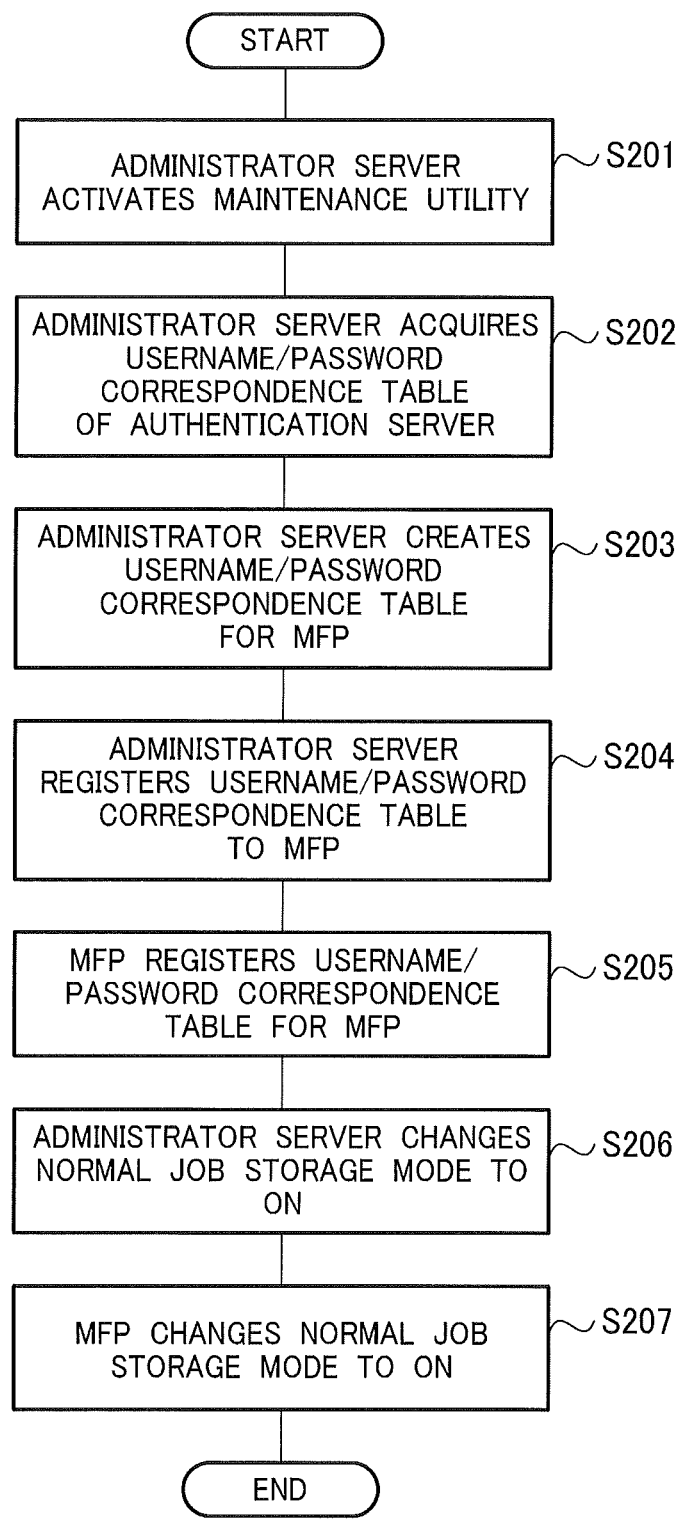
FIG. 19 is a flowchart showing setup processing of an MFP according to the first embodiment.

Next, the setup processing of the MFP 104 (step S101 in FIG. 18) of the first embodiment will be described with reference to FIG. 19. FIG. 19 is a flowchart showing the setup processing of the MFP 104.

In step S201, the administrator server 101 receives the administrator's operation, and activates the maintenance utility 106.

In step S202, the administrator server 101 causes the username/password processor 108 to acquire the username/password correspondence table 112 from the authentication server 102.

In step S203, the administrator server 101 causes the MFP-username/password correspondence table creation processor 109 to convert the acquired username/password correspondence table 112 into a format registerable to the MFP 104, and create the username/password correspondence table 125 for the MFP 104.

In step S204, the administrator server 101 causes the username/password correspondence table registration processor 110 to register the created username/password correspondence table 125 to the MFP 104.

In step S205, the MFP 104 causes the username/password correspondence registration processor 124 of the login management unit 115 to store the username/password correspondence table 125 for the MFP 104 in the storage unit.

In step S206, the administrator server 101 receives the administrator's operation to change the normal job storage mode flag 127 to "ON" for reducing wasteful printing, and sends a notification to the MFP 104.

In step S207, the MFP 104 receives the notification (instructing to change the normal job storage mode flag 127 to "ON") from the administrator server 101, and causes the normal job storage mode changing processor 126 of the parameter management unit 116 to change the normal job storage mode flag 127 from "OFF" (FIG. 5) to "ON" (FIG. 6). Then, the setup processing of the MFP 104 is terminated.

Figure 20:
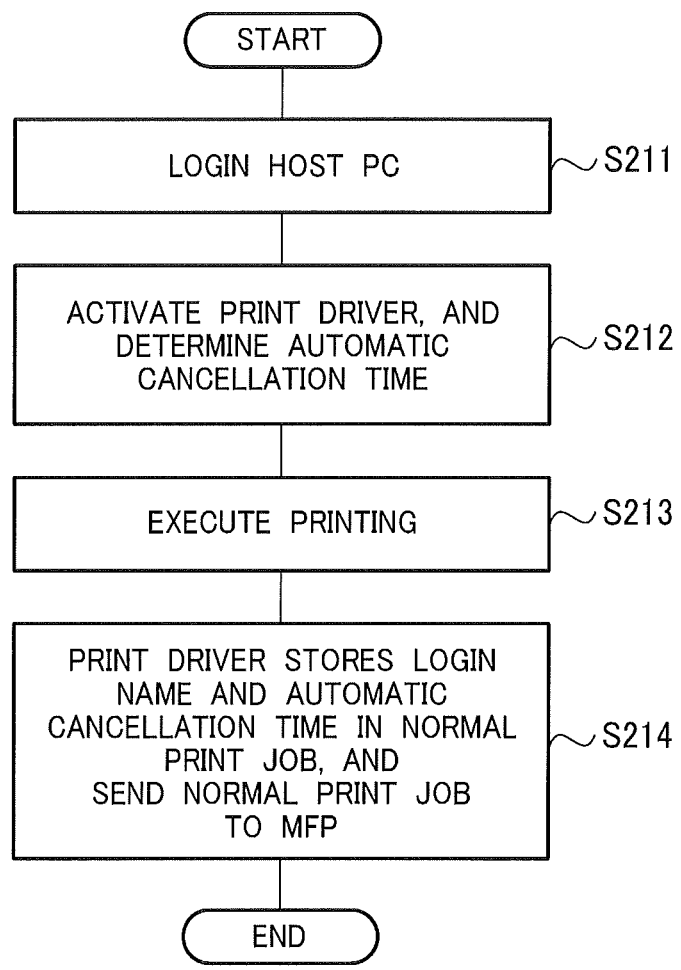
FIG. 20 is a flowchart showing print execution processing according to the first embodiment.

Next, the print execution processing (step S102 in FIG. 18) executed by the host PC 103 of the first embodiment will be described with reference to FIG. 20. FIG. 20 is a flowchart showing the print execution processing executed by the host PC 103.

In step S211, the host PC 103 receives the user's operation, and executes the login processing. In this step, the host PC 103 stores the username (of the user who logs in the host PC 103) in the login name information 114.

In step S212, the host PC 103 receives the user's operation, and activates the print driver 113. Further, the host PC 103 allows the user to input the automatic cancellation time of the print job via the automatic cancellation time setting tabs shown in FIG. 15. The print driver 113 of the host PC 103 holds the automatic cancellation time set by the user's operation.

In step S213, the host PC 103 receives the user's operation to execute the printing using the print driver 113.

In step S214, the print driver 113 of the host PC 103 stores the login name information 114 and the automatic cancellation time respectively in the username 1402 and the automatic cancellation time 1403 of the normal print job 1401 shown in FIG. 14, and sends the normal print job 1401 to the MFP 104. Then, the print execution processing is terminated.

Figure 21:
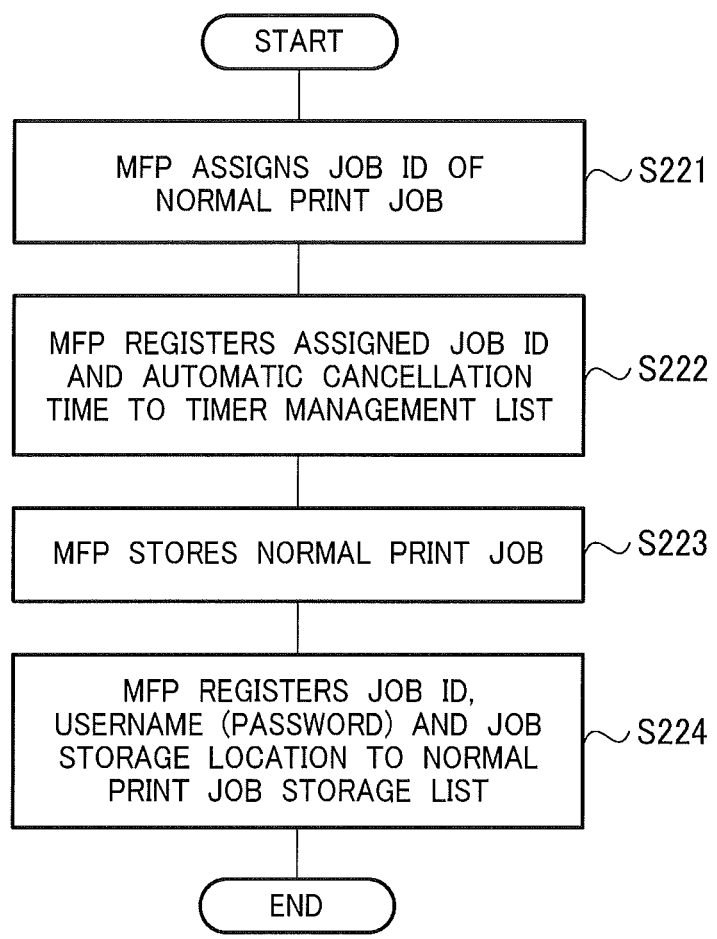
FIG. 21 is a flowchart showing normal print job storage processing according to the first embodiment.

Next, the normal print job storage processing (step S105 in FIG. 18) executed by the MFP 104 of the first embodiment will be described with reference to FIG. 21. FIG. 21 is a flowchart showing the normal print job storage processing executed by the MFP 104.

In step S221, the MFP 104 causes the job ID assignment processor 128 of the job management unit 118 to assign the job ID to the normal print job 1401. The job ID assigned to the normal print job 1401 is, for example, as shown in FIG. 7.

In step S222, the MFP 104 causes the timer management list registration processor 135 of the timer management unit 119 to register the assigned job ID and the automatic cancellation time 1403 to the timer management list 136. The timer management list 136 before registration is, for example, as shown in FIG. 10. The timer management list 136 after registration is, for example, as shown in FIG. 11.

In step S223, the MFP 104 causes the job storage processor 133 of the storage job management unit 130 to store the normal print job 1401 in the job storage region 142 of the storage device 121.

In step S224, the MFP 104 (having stored the normal print job 1401) causes the normal job storage list registration processor 131 of the storage job management unit 130 to register the assigned job ID, the username 1402 (password) and the job storage location to the normal print job list 132. Then, the normal print job storage processing is terminated. The normal print job list 132 before registration is, for example, as shown in FIG. 8. The normal print job list 132 after registration is, for example, as shown in FIG. 9.

Figure 22:
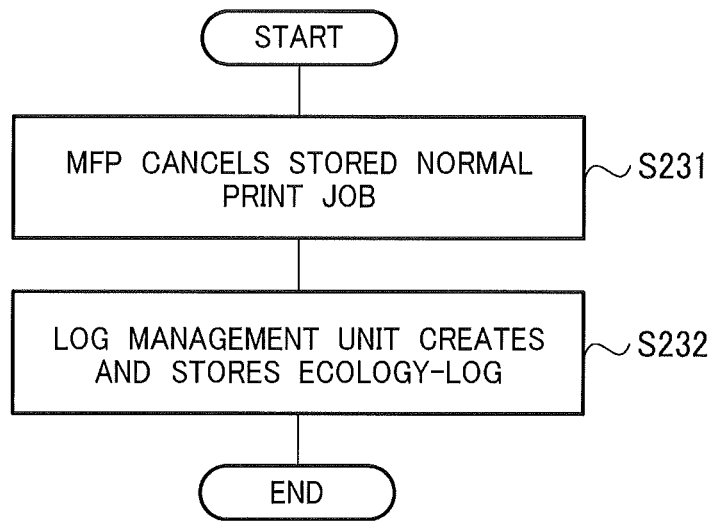
FIG. 22 is a flowchart showing ecology-log storage processing according to the first embodiment.

Next, the ecology-log storage processing (step S111 in FIG. 18) executed by the MFP 104 of the first embodiment will be described with reference to FIG. 22. FIG. 22 is a flowchart showing the ecology-log storage processing executed by the MFP 104.

In step S231, the MFP 104 cancels the printing of the normal print job 1401.

In step S232, the MFP 104 (having cancelled the printing of the normal print job 1401) causes the ecology-log creation processor 138 of the log management unit 120 to create the ecology-log 139, and causes the ecology-log storage processor 140 to store the created ecology-log 139 in the ecology-log storage region 143 of the storage device 121. Then, the ecology-log storage processing is terminated. The ecology-log 139 is, for example, as shown in FIG. 13.

Figure 23:
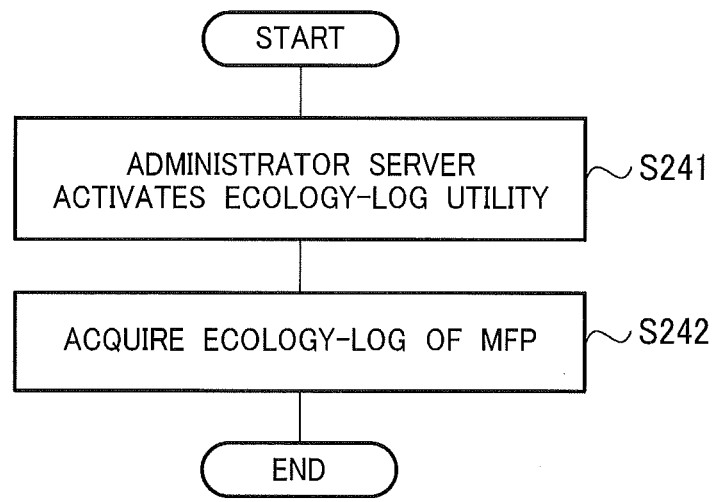
FIG. 23 is a flowchart showing ecology-log collection processing according to the first embodiment.

Next, the ecology-log collection processing (step S112 in FIG. 18) executed by the administrator server 101 of the first embodiment will be described with reference to FIG. 23. FIG. 23 is a flowchart showing the ecology-log collection processing executed by the administrator server 101.

In step S241, the administrator server 101 receives the administrator's operation, and activates the ecology-log utility 107.

In step S242, the administrator server 101 causes the ecology acquiring processor 111 of the ecology-log utility 107 to acquire the ecology-log 139 of the MFP 104. Then, the ecology-log collection processing is terminated.

Figure 24:
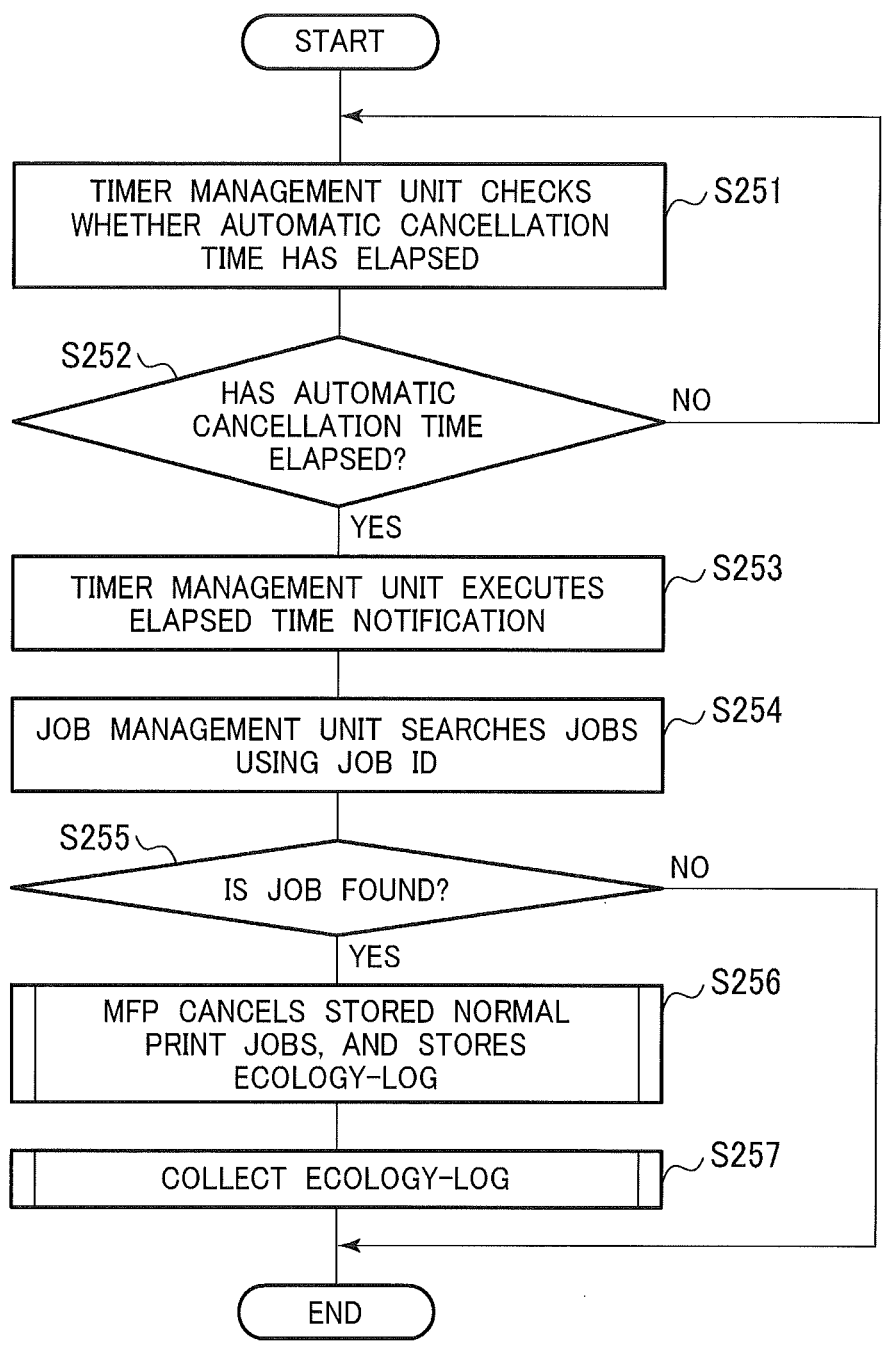
FIG. 24 is a flowchart showing automatic cancellation processing according to the first embodiment.

Next, the automatic cancellation processing executed by the MFP 104 of the first embodiment will be described with reference to FIG. 24. FIG. 24 is a flowchart showing the automatic cancellation processing executed by the MFP 104.

In step S251, the timer management unit 119 of the MFP 104 checks the elapsed time (after the reception date/time of the normal print job 1401 and before current date/time), and checks whether the automatic cancellation time 1403 of the normal print job 1401 (i.e., the monitoring time) registered in the timer management list 136 has elapsed or not. This checking is executed at predetermined time intervals (for example, 5 minutes).

In step S252, when the timer management unit 119 determines that the automatic cancellation time 1403 has elapsed, the timer management unit 119 proceeds to step S253. When the timer management unit 119 determines that the automatic cancellation time 1403 has not yet elapsed, the timer management unit 119 returns to step S251.

In step S253, the timer management unit 119 (having determined that the automatic cancellation time 1403 has elapsed) determines that the automatic cancellation time 1403 has elapsed before the user (who created the normal print job 1401) logs in, and causes the elapsed time notification processor 137 to send the elapsed time notification shown in FIG. 12 to the job management unit 118.

In step S254, the job management unit 118 that receives the elapsed time notification acquires the job ID from the elapsed time notification, and searches the normal print job storage list 132 based on the acquired job ID.

In step S255, when the job management unit 118 finds the job ID (coinciding with the job ID acquired from the elapsed time notification) in the normal print job storage list 132, the job management unit 118 proceeds to step S256. When the job management unit 118 does not find such job ID in the normal print job storage list 132, the automatic cancellation processing is terminated.

In step S256, the job management unit 118 cancels the printing of the normal print job 1401 having the job ID coinciding with the job ID acquired from the elapsed time notification, and executes the ecology-log storage processing to create and store the ecology-log 139.

Optionally, if the user logs in the MFP 104 when the job management unit 118 cancels the printing of the normal print job 1401, the job management unit 118 may inform the user of cancellation of the printing of the normal print job 1401 via the panel management unit 122 after cancelling the printing of the normal print job 1401. If the user does not log in the MFP 104 when the job management unit 118 cancels the printing of the normal print job 1401, the job management unit 118 may inform the user of the cancellation of the printing of the normal print job 1401 via the panel management unit 122 when the user logs in the MFP 104 next time.

In step S257, the administrator server 101 receives the administrator's operation, and executes the ecology-log collection processing to collect the ecology-logs 139 having been created and stored upon cancellation of the normal print job 1401. Then, the automatic cancellation processing is terminated. Based on the ecology-log 139, the administrator can confirm the number of printings saved by cancellation of the normal print jobs.

As described above, according to the first embodiment, when the normal job storage mode is set in the MFP 104, the MFP 104 stores the print job (received from the host PC 103) in the storage unit without immediately printing the print job. The printing of the print job is executed when the authentication is completed by the user's operation. Therefore, it becomes possible to prevent the printed medium from being left behind on the MFP 104. That is, leakage of information to a third person can be prevented. Thus, convenience in printing of the normal printing job is enhanced.

Further, since the print job stored in the MFP 104 can be cancelled before printing, it becomes possible to reduce wasteful printing due to an operation error in the host PC 103.

Furthermore, the administrator server 101 collects the number of media saved by cancellation of the print job (i.e., the saved printing number), and therefore it becomes possible to confirm the number of printings saved by cancellation of the print job.

Second Embodiment

The second embodiment is different from the first embodiment in configurations of the host PC and the MFP. The configuration of the second embodiment will be described with reference to FIGS. 25 through 33. Components that are the same as those of the first embodiment are assigned with the same reference numerals.

Figure 25:
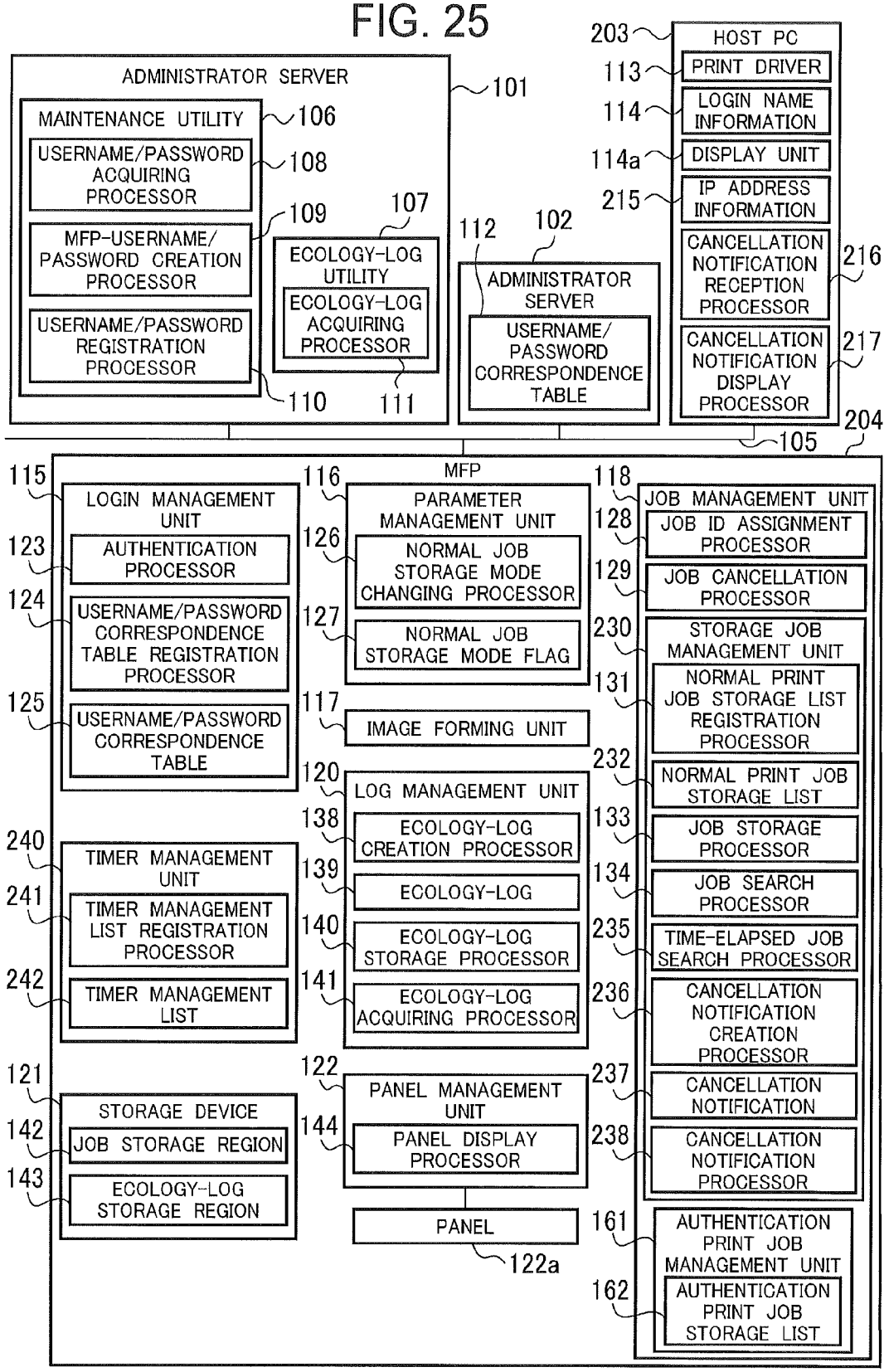
FIG. 25 is a block diagram showing a configuration of an image forming system according to the second embodiment.

FIG. 25 is a block diagram showing an image forming system of the second embodiment. In FIG. 25, the image forming system includes the administrator server 101, the authentication server 102, a host PC 203 (corresponding to the host PC 103 of the first embodiment), and an MFP 204 (corresponding to the MFP 104 of the first embodiment). The administrator server 101, the authentication server 102, the host PC 203 and the MFP 204 are communicably connected one another via the network 105 as a communication unit.

The host PC 203 (i.e., an information processing unit) creates a normal print job 3901 including the username, the print data and an automatic cancellation time 3904. The host PC 203 sends the normal print job 3901 to the MFP 204. The host PC 203 includes the print driver 113 (i.e., an information processing control unit), the login name information 114, the display unit 114a, IP address information 215, a cancellation notification reception processor 216 and a cancellation notification display processor 217. When the user is going to log in the host PC 203, the host PC 203 cooperates with the authentication server 102, and determines whether or not to allow the user to log in the host PC 203 by referring to the authentication server 102.

The IP address information 215 is an IP address of the host PC 203. In this embodiment, for example, "10.49.133.157" is stored in the IP address information 215.

The cancellation notification reception processor 216 executes processing to receive a cancellation notification 237 shown in FIG. 31 from the MFP 204.

Figure 34:
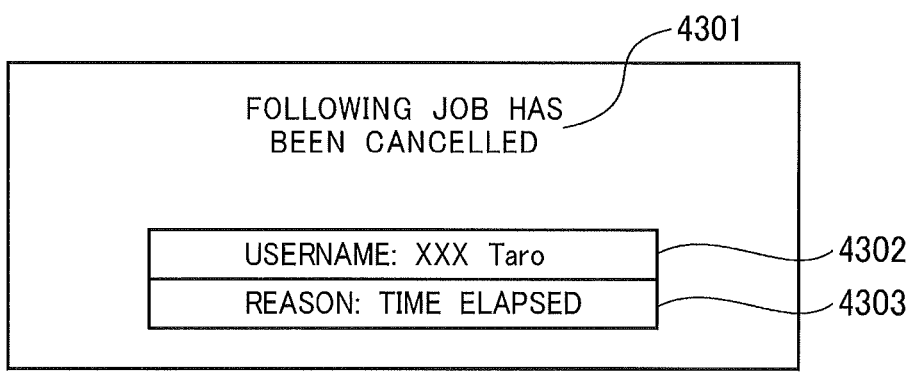
FIG. 34 is an explanatory view of a print job cancellation notification display according to the second embodiment.

The cancellation notification display processor 217 (i.e., a cancelling notification display unit) executes processing to cause the display unit 114a of the host PC 203 to display indication that the cancellation notification 237 is received, when the cancellation notification display processor 217 receives the cancellation notification 237 (FIG. 31) from the MFP 204. For example, the cancellation notification display processor 217 causes the display unit 114a to display as shown in FIG. 34.

The MFP 204 (i.e., an image processing unit) is a device having functions of copying, facsimile, printing, scanning and the like. The MFP 204 includes the login management unit 115 (i.e., an identification information reception unit), the parameter management unit 116 (i.e., a mode management unit), the image forming unit 117, the job management unit 118, a timer management unit 240, the log management unit 120, the storage device 121 and the panel management unit 122.

The job management unit 118 (i.e., a control unit) is configured to entirely manage the print jobs received by the MFP 204. The job management unit 118 includes the job ID assignment processor 128, the job cancellation processor 129, a storage job management unit 230 and the authentication print job management unit 161.

The job ID assignment processor 128 executes processing to assign a unique ID to each of the print jobs received by the MFP 204. The ID assigned to each print job is referred to as a job ID. FIG. 26 is an explanatory view showing the job ID assigned to the print job. As shown in FIG. 26, for example, the job ID of "44" is assigned to the normal print job 3901.

The job cancellation processor 129 (i.e., a job cancellation processing unit) executes processing to cancel (delete) the print job that has been input into the MFP 204.

The storage job management unit 230 (i.e., a determination unit) is configured to temporarily store all of the print jobs (including the normal print jobs having no instruction of authentication printing) which are to be stored according to the normal job storage mode flag 127 in the storage unit. The storage job management unit 230 includes a normal print job storage list registration processor 231, a normal print job storage list 232, the job storage processor 133, the job search processor 134, a time-elapsed job search processor 235, a cancellation notification creation processor 236, a cancellation notification 237, and a cancellation notification processor 238.

The normal print job storage list registration processor 131 executes processing to register the job IDs, the usernames (passwords), the storage locations (i.e., job storage locations), reception dates/times and IP addresses of the print jobs (which are to be stored) to the normal print job storage list 232.

The normal print job storage list 232 is a group of information on the print jobs stored in the storage unit of the MFP 204. FIG. 27 is an explanatory view of the normal print job storage list 232. As shown in FIG. 27, the normal print job storage list 232 includes the job IDs, the usernames (passwords), the job-storage locations, the reception dates/times and the IP addresses. FIG. 28 shows a state where a print job having the job ID of "44", the username (password) of "XXX Taro", the job storage location of "job storage region", and the reception date/time of "XXXX (year), XX (month), XX (day), XX:XX (time)" and the IP address of "10.49.133.157" is added to the normal print job storage list 232 of FIG. 27.

The job storage processor 133 executes processing to store the received print job in the job storage region 142 of the storage device 121 (i.e., the storage unit).

The job search processor 134 executes processing to search the normal print job storage list 232 based on the designated job ID and the username (password).

The time-elapsed job management search processor 235 executes processing to search a timer management list 242 of the timer management unit 240 to find the print job which is in a time-elapsed state.

The cancellation notification creation processor 236 creates the cancellation notification 237 when the printing of the print job stored in the normal print job storage list 232 is cancelled due to time elapsing.

The cancellation notification 237 includes a cancelled time, the job ID, the IP address, the username, a result and a reason. The cancellation notification 237 is, for example, as shown in FIG. 31.

The cancellation notification processor 238 executes processing to send the cancellation notification 237 to the IP address (i.e., the IP address 3902 of the normal print job 3901) of the cancelled print job.

The job management unit 118 stores all of the print jobs which are received according to the normal job storage mode flag 127 of "ON" in the storage unit. Further, when the login management unit 115 receives input of the username, the job management unit 118 searches the print jobs of the normal print job storage list 232 stored in the storage unit based on the username for which the personal authentication is completed by the login management unit 115, and finds the print job including the username.

The image forming unit 117 prints the print data included in the print job found by the job management unit 118.

When the job management unit 118 receives (at the panel management unit 122) an instruction to cancel the printing of the print job, the job management unit 118 deletes the print job from the job storage region 142 of the storage device 121 and from the normal print job storage list 232 without causing the image forming unit 117 to execute printing.

Further, when the job management unit 118 stores the print job (received according to the normal job storage mode flag 127 of "ON") in the job storage region 142 of the storage device 121, the job management unit 118 searches the timer management list 242 of the timer management unit 240 to find the print job which is in the time-elapsed state. Then, the job management unit 118 deletes the print job (in the time-elapsed state) from the job storage region 142 of the storage device 121 and from the normal print job storage list 232 without causing the image forming unit 117 to print the print job, and sends the cancellation notification 237 to the IP address (i.e., the IP address 3902 of the normal print job 3901) of the cancelled print job, i.e., to the host PC 203.

The timer management unit 240 (i.e., an elapsed time management unit) checks whether an elapsed time after receiving the print job exceeds the automatic cancellation time (included in the print job) for each of the print jobs. The timer management registration processor 240 includes a timer management list registration processor 241 and the timer management list 242.

The timer management list registration processor 241 executes processing to register the designated job ID, the monitoring time (i.e., automatic cancellation time) and a state (i.e., monitored or not) to the timer management list 242, and to update the designated job ID, the monitoring time and the state.

The timer management list 242 is a group of information, i.e., a list of the print jobs whose elapsed times are being monitored. The timer management list 242 includes the job IDs, the monitoring times (i.e., automatic cancellation times) and the states as shown in FIG. 29. FIG. 30 shows a state where the print job having the job ID of "44", the monitoring time of "15 minutes" and the state of "being monitored" is added to the timer management list 242 shown in FIG. 29.

Figure 32:
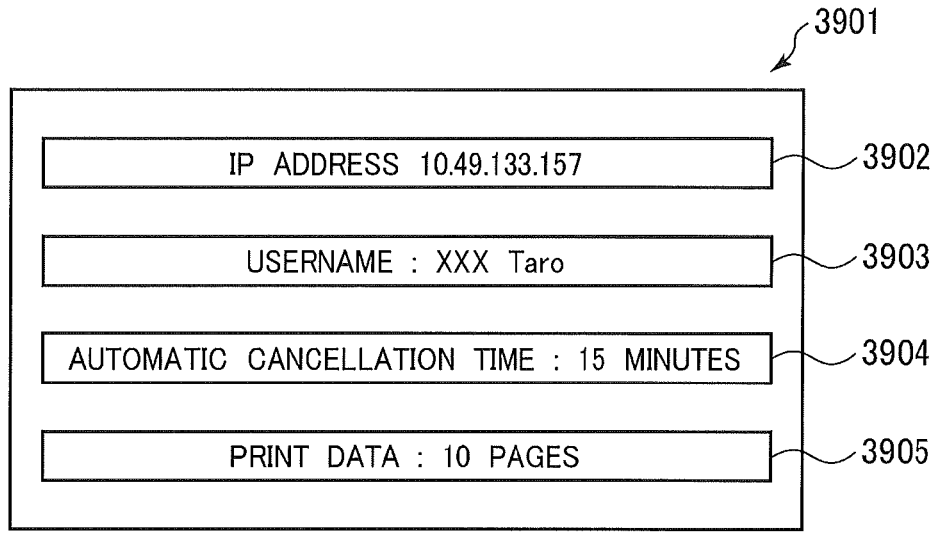
FIG. 32 is an explanatory view of the normal print job according to the second embodiment.

FIG. 32 is an explanatory view of the normal print job of the second embodiment. In FIG. 32, the normal print job 3901 includes an IP address 3902, an execution user name 3903, an automatic cancellation time 3904, and print data 3905. FIG. 32 shows the print job created when the user "XXX Taro" executes the printing on 10 pages while setting the IP address to "10.49.133.157" and the automatic cancellation time to "15 minutes".

In the IP address 3902, the IP address information 215 of the host PC 203 is stored. In the execution user name 3903, the username of the user who is going to execute the print job is stored. In the automatic cancellation time 3904, a time to automatically cancel the normal print job if the normal print job is not printed until a designated time elapses is stored. The automatic cancellation time 3904 is set by the user's operation via the panel display shown in FIG. 33.

The print data 3905 is print data which is to be printed according to the normal print job.

Figure 33:
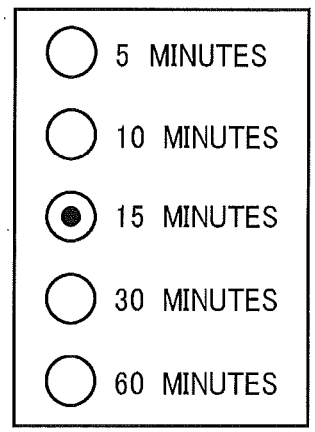
FIG. 33 is an explanatory view of tabs for selecting an automatic cancellation time according to the second embodiment.

FIG. 33 is an explanatory view of tabs (i.e., automatic cancellation time selection tabs) for selecting the automatic cancellation time 3904. The automatic cancellation time selection tabs are displayed on the display unit 114a of the host PC 203 when the user is going to set the automatic cancellation time during the creation of the normal print job 3901. That is, the automatic cancellation time selection tabs are displayed when printing is executed using the print driver 113 of the host PC 203.

The automatic cancellation time selection tabs allow the user to select the automatic cancellation time among 5, 10, 15, and 60 minutes. When the user selects the automatic cancellation time and operates to execute printing, the normal print job 3901 is created. The automatic cancellation time selected by the user is set to the automatic cancellation time 3904.

FIG. 34 is an explanatory view of a print job cancellation notification display of the second embodiment. The print job cancellation notification display is displayed on the host PC 203 when the print job is cancelled due to time elapsing. The print job cancellation notification display includes a display statement 4301, a username 4302 and a reason 4303.

The display statement 4301 is a statement to inform the user of the cancellation of the print job. The display statement 4301 is, for example, a statement that "the following job is cancelled". The username 4302 is the name of the user who executes the print job at the MFP 204. The reason 403 is a reason why the print job is cancelled.

The before-login panel display and after-login panel display of the second embodiment are the same as those shown in FIGS. 16 and 17 of the first embodiment, and therefore description thereof will be omitted.

An operation of the image forming system having the above described configuration will be described with reference to FIGS. 35 through 39 as well as FIGS. 25 and 32.

First, main processing executed by the image forming system of the second embodiment will be described with reference to FIG. 35. Here, it is assumed that the print job is not the authentication print job, but is the normal print job.

Figure 35:
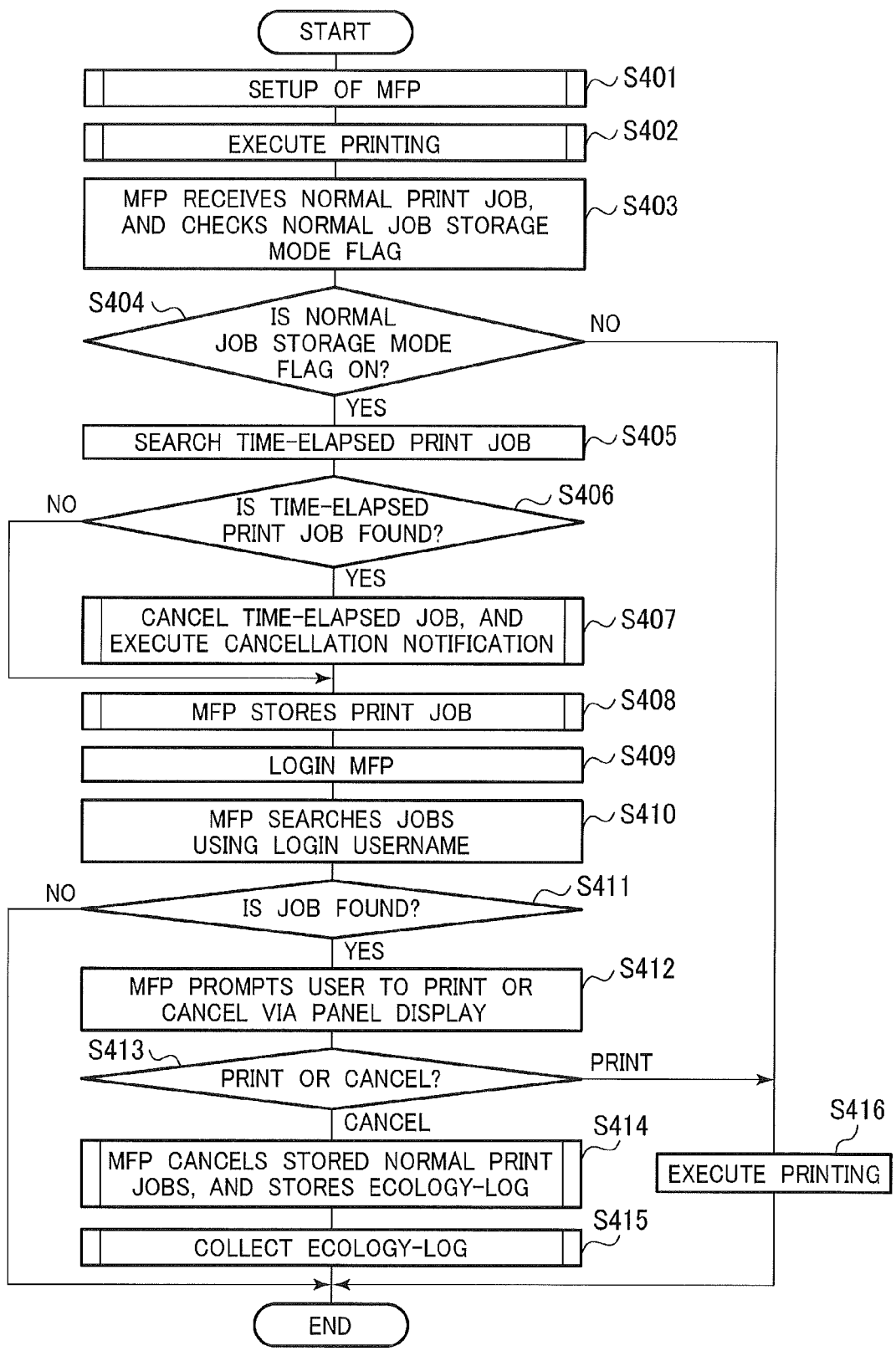
FIG. 35 is a flowchart showing main processing according to the second embodiment.

FIG. 35 is a flowchart showing the main processing executed by the image forming system of the second embodiment. In step S401, the MFP 204 receives an operation of the administrator of the image forming system, and executes the setup processing of the MFP 204 so that the user can use the MFP 204. The setup processing is the same as that of the first embodiment.

In step S402, the user logs in the host PC 203, and executes the print execution processing using the print driver 113. The normal print job 3901 is sent to the MFP 204. Detailed description of the print execution processing will be made later.

In step S403, the MFP 204 receives the normal print job 3901 sent from the host PC 103, and proceeds to check the normal job storage mode flag 127.

In step S404, the MFP 204 checks whether the normal job storage mode flag 127 is ON or OFF. If the normal job storage mode flag 127 is ON, the MFP 204 proceeds to step S405. If the normal job storage mode flag 127 is OFF, the MFP 204 proceeds to step S416 without storing the normal print job 3901.

In step S405, the MFP 204 (having determined that the normal job storage mode flag 127 is ON) causes the elapsed time job search processor 235 of the storage job management unit 230 to check the existence of the time-elapsed print job, based on the reception date/time of the print job 3901 and the current date/time.

In step S406, when the MFP 204 determines that the time-elapsed print job exists, the MFP 204 proceeds to step S407.

When the MFP 204 determines that such a print job does not exist, the MFP 204 proceeds to step S408.

In step S407, the MFP 204 (having determined that the time-elapsed print job exists) cancels the time-elapsed print job, and executes print job cancellation notification processing. Detailed description of the print job cancellation notification processing will be made later.

Optionally, the MFP 204 may send inquiry to the host PC 203 whether the user wants to cancel the print job or not, and cancel the print job if the user wants to cancel the print job. In this regard, if the user does not logs in the host PC 203, the MFP 204 may send the inquiry when the user logs in the host PC 203 next time, and cancel the print job if the user wants to cancel the print job.

In step S408, the MFP 204 (having determined that the normal job storage mode flag 127 is ON in step S404) executes normal print job storage processing to store the received normal print job 3901. Detailed description of the normal print job storage processing will be made later.

Since the normal print job 3901 sent from the host PC 203 is stored in the MFP 204, the user goes to the MFP 204 to log in the MFP 204. In step S409, the MFP 204 receives the username and the password input by the user when the user logs in the MFP 204. For example, the user inputs "XXX Taro" in the username 1602 and "xxxxxx" in the password 1603 of the panel display shown in FIG. 16.

The MFP 204 causes the authentication processor 123 to determine whether or not to allow the user to log in the MFP 204. In this example, the username "XXX Taro" and the password "xxxxxx" exist in the username/password correspondence table 125, and therefore the user is allowed to log in the MFP 204.

In step S410, the MFP 204 causes the job search processor 134 to search the normal print job storage list 232 based on the username of the user who logs in the MFP 204.

In step S411, the MFP 204 checks whether the normal print job 3901 is found in the normal print job storage list 232. If the normal print job 3901 is found in the normal print job storage list 232, the MFP 204 proceeds to step S412. If the normal print job 3901 is not found in the normal print job storage list 232, the main processing is terminated.

In step S412, the MFP 204 (having found the normal print job 3901 in the normal print job storage list 232) displays the panel display (FIG. 17) to prompt the user to determine whether to execute or cancel the printing of the normal print job 3901.

In step S413, if the user selects execution of the printing of the normal print job 3901, the MFP 204 proceeds to step S416. If the user selects cancellation of the normal print job 3901, the MFP 204 proceeds to step S414.

In this regard, if there are plural normal print jobs 3901, the MFP 204 prompts the user to determine whether to execute or cancel the printing of all of the normal print jobs 3901.

In step S414, the MFP 204 (having determined that the user selects cancellation of the normal print job 3901) cancels the printing of the normal print job 3901, and executes ecology-log storage processing to create and store the ecology-log 139. Description of the ecology-log storage processing will be made later.

In this regard, if there are plural normal print jobs 3901 cancelled by the user, the MFP 204 cancels printings of these normal print jobs 3901, and creates and stores the ecology-logs 139.

In step S415, the administrator executes the ecology-log collection processing to collect the ecology-logs 139 created and stored upon cancellation of the normal print job 3901. The administrator can confirm the number of printings (i.e., the number of media) saved by the cancellation of the print job 3901. The ecology-log collection processing is the same as that described in the first embodiment.

In step S416, the MFP 204 causes the image forming unit 117 to execute the printing, and the image forming unit 117 prints the normal print job 3901. Then, the main processing is terminated.

As above, when the normal job storage mode flag 127 is set to "ON" in the MFP 204, the MFP 204 does not print the print job (sent from the host PC 203), but stores the print job in the storage unit. The stored print job is printed when the authentication of the user is completed based on the user's operation. Therefore, it becomes possible to reduce a possibility that the printed medium is left behind on the MFP 204. That is, leakage of information to a third person can be prevented. Thus, convenience in printing of the normal print job can be enhanced.

Further, since the print job stored in the MFP 204 can be cancelled before printing, it becomes possible to reduce wasteful printing due to an operation error at the host PC 203.

Figure 36:
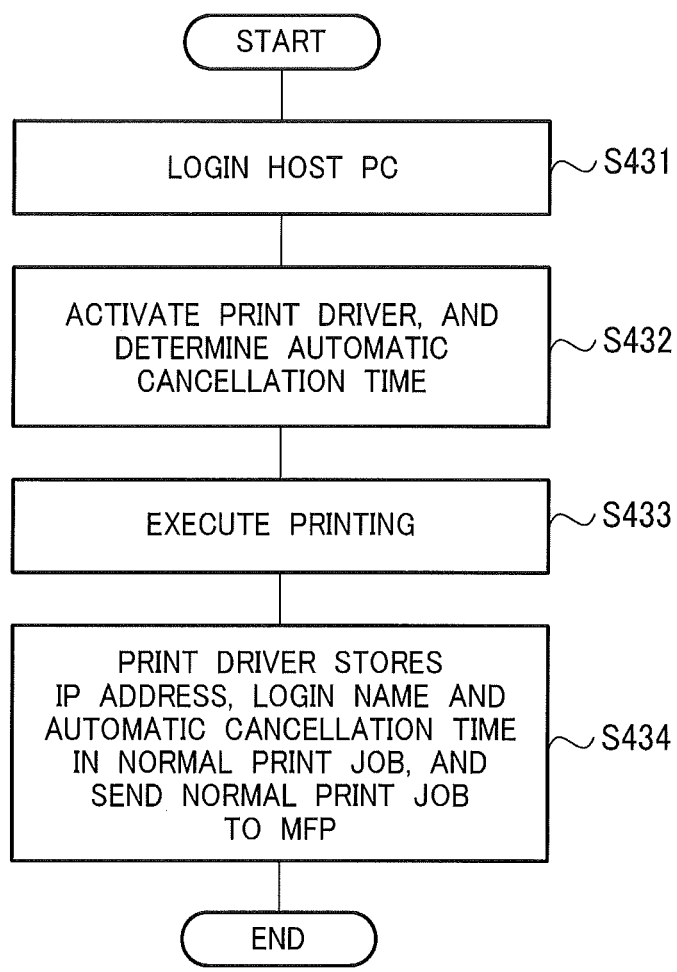
FIG. 36 is a flowchart showing print execution processing according to the second embodiment.

Next, the print execution processing (step S402 in FIG. 35) executed by the host PC 203 of the second embodiment will be described with reference to FIG. 36. FIG. 36 is a flowchart showing the print execution processing executed by the host PC 203.

In step S431, the host PC 203 receives the user's operation, and executes the login processing. In this step, the host PC 203 stores the username of the user (who logs in the host PC 203) in the login name information 114.

In step S432, the host PC 203 receives the user's operation, and activates the print driver 113. Further, the host PC 203 receives the automatic cancellation time of the print job input by the user via the automatic cancellation time setting tabs shown in FIG. 33. The print driver 113 of the host PC 203 holds the automatic cancellation time selected by the user's operation.

In step S433, the host PC 203 receives the user's operation to execute the printing using the print driver 113.

In step S434, the print driver 113 of the host PC 103 stores the IP address information 215, the login name information 114 and the automatic cancellation time respectively in the IP address 3902, the username 3903 and the automatic cancellation time 3904 of the normal print job 3901 shown in FIG. 32, and sends the normal print job 3901 to the MFP 204. Then, the print execution processing is terminated.

Figure 37:
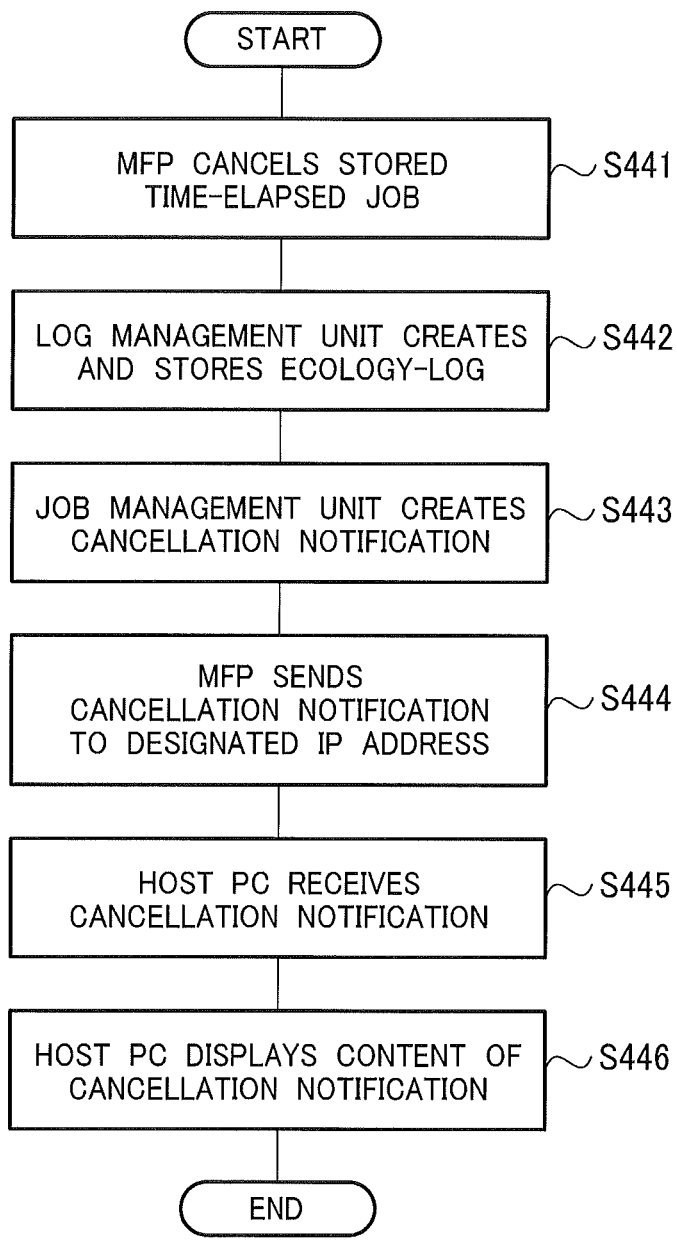
FIG. 37 is a flowchart showing print job cancellation notification processing according to the second embodiment.

Next, the print job cancellation notification processing (step S407 in FIG. 35) executed by the MFP 204 of the second embodiment will be described with reference to FIG. 37. FIG. 37 is a flowchart showing the print job cancellation notification processing executed by the MFP 204.

In step S441, when the time-elapsed job management search processor 235 finds the time-elapsed print job, the job management unit 118 of the MFP 204 acquires the job ID of the time-elapsed print job from the timer management list 242, and causes the job cancellation processor 129 to cancel the printing of the normal print job 3901 having the job ID.

In step S442, the log management unit 120 of the MFP 204 causes the ecology-log creation processor 138 (i.e., a log creation unit) to create the ecology-log 139 shown in FIG. 22, and causes the ecology-log storage processor 140 to store the ecology-log 139 in the ecology-log storage region 143 of the storage device 121. The created ecology-log 139 is, for example, as shown in FIG. 13.

In step S443, the job management unit 118 (having cancelled the normal print job 3901) causes the cancellation notification creation processor 236 to create the cancellation notification 237.

In step S444, the MFP 204 sends the created cancellation notification 237 to the designated IP address (i.e., the IP address 3902 of the cancelled normal print job 3901).

In step S445, the host PC 203 causes the cancellation notification reception processor 216 to receive the cancellation notification 237 sent from the MFP 204.

In step S446, the host PC 203 (having received the cancellation notification 237) causes the cancellation notification display processor 217 to display the received cancellation notification on the display unit 114a. The cancellation notification is, for example, as shown in FIG. 34. Then, the print job cancellation notification processing is terminated.

Optionally, if the user logs in the host PC 203 when the job management unit 118 cancels the printing of the normal print job 3901, the host PC 203 may inform the user of the cancellation of the printing of the normal print job 3901 using the display 114a. If the user does not log in the host PC 203 when the job management unit 118 cancels the printing of the normal print job 3901, the host PC 203 may inform the user of the cancellation of the printing of the normal print job 3901 using the display 114a when the user logs in the host PC 203 next time.

As above, when the print job is cancelled for the reason that the time designated by the host PC 203 has elapsed, the host PC 203 presents (displays) the cancellation of the print job and the reason. Therefore, the user can know that the print job is cancelled and the reason thereof.

Figure 38:
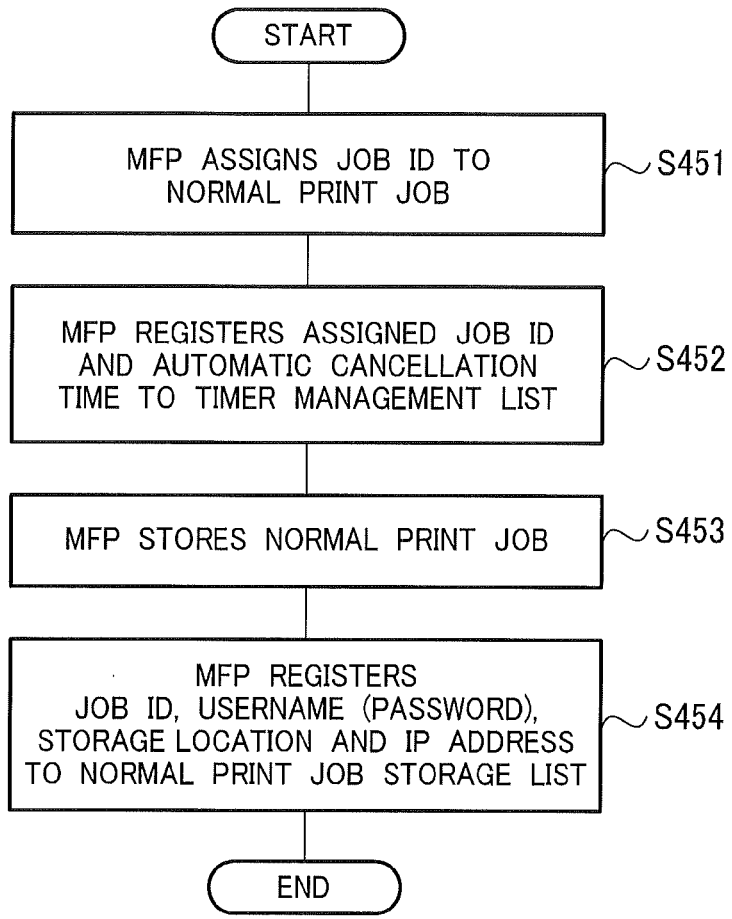
FIG. 38 is a flowchart showing normal print job storage processing according to the second embodiment.

Next, the normal print job storage processing (step S408 in FIG. 35) executed by the MFP 204 of the second embodiment will be described with reference to FIG. 38. FIG. 38 is a flowchart showing the normal print job storage processing executed by the MFP 204.

In step S451, the MFP 204 causes the job ID assignment processor 128 of the job management unit 118 to assign the job ID to the normal print job 3901. The job ID assigned to the normal print job 3901 is, for example, as shown in FIG. 26.

In step S452, the MFP 204 causes the timer management list registration processor 241 of the timer management unit 240 to register the assigned job ID and the automatic cancellation time 3904 to the timer management list 242. The timer management list 242 before registration is, for example, as shown in FIG. 29. The timer management list 242 after registration is, for example, as shown in FIG. 30.

In step S453, the MFP 204 causes the job storage processor 133 of the storage job management unit 230 to store the normal print job 3901 in the job storage region 142 of the storage device 121.

In step S454, the MFP 204 (having stored the normal print job 3901) causes the normal job storage list registration processor 131 of the storage job management unit 230 to register the assigned job ID, the username 3903 (password), the job storage location and the IP address 3902 to the normal print job list 232. Then, the normal print job storage processing is terminated. The normal print job list 232 before registration is, for example, as shown in FIG. 27. The normal print job list 232 after registration is, for example, as shown in FIG. 28.

Figure 39:
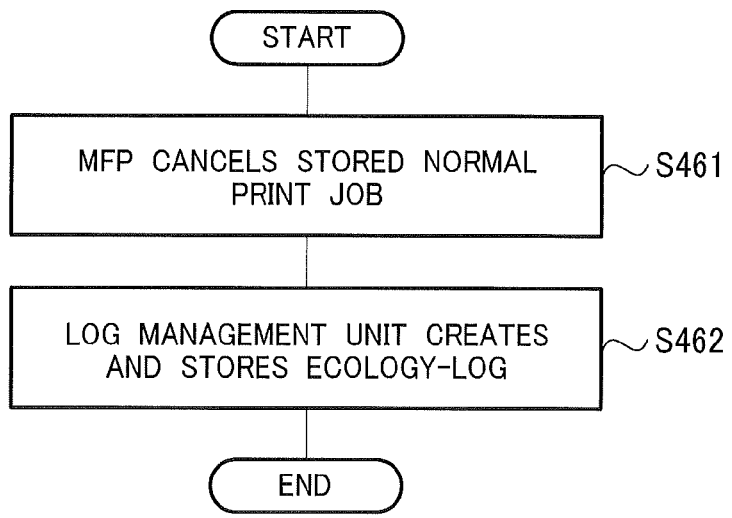
FIG. 39 is a flowchart showing ecology-log storage processing according to the second embodiment.

Next, the ecology-log storage processing (step S414 in FIG. 35) executed by the MFP 204 of the second embodiment will be described with reference to FIG. 39. FIG. 39 is a flowchart showing the ecology-log storage processing executed by the MFP 204.

In step S461, the MFP 204 cancels the printing of the normal print job 3901.

In step S462, the MFP 204 (having cancelled the printing of the normal print job 3901) causes the ecology-log creation processor 138 of the log management unit 120 to create the ecology-log 139, and causes the ecology-log storage processor 140 to store the created ecology-log 139 in the ecology-log storage region 143 of the storage device 121. The ecology-log 139 is, for example, as shown in FIG. 13. Then, the ecology-log storage processing is terminated.

As described above, according to the second embodiment, if the print job is cancelled for the reason that the designated time elapses, the host PC informs the user of the cancellation of the print job and the reason. Therefore, the user can know that the print job is cancelled and the reason thereof.

In the first and second embodiments, the MFP, the host PC and the administrator server are connected by the network. However, the present invention is not limited to such a configuration. For example, it is also possible to use wired or wireless communication system such as USB (Universal Serial Bus), infrared communication, Bluetooth (trademark) or the like instead of (or in addition to) network.

Further, in the first and second embodiments, the MFP is described as an example of the image forming apparatus. However, the image forming apparatus of the present invention can be a printer, a facsimile machine or the like.

Moreover, in the first and second embodiments, whether or not to store the print job is determined by ON/OFF of the normal job storage mode. However, an instruction to store the print job may be added to the print job.

Furthermore, in the first and second embodiments, the authentication of the logging-in user is executed using the username and password. However, the authentication of the logging-in user can be executed using fingerprint authentication or other biometrics authentication.

In addition, in the first and second embodiments, the automatic cancellation time is selected by the user's operation. However, the cancellation time can be a fixed time. Further, the cancellation time can be a preliminarily set time which is changeable by an operation panel.

While the preferred embodiments of the present invention have been illustrated in detail, it should be apparent that modifications and improvements may be made to the invention without departing from the spirit and scope of the invention as described in the following claims.

What is claimed is:

1. An image processing apparatus comprising:
   a processor, that performs processing operations of:
   a determination unit that determines whether a print job received from outside is a normal print job or an authentication print job;
   a mode management unit that determines whether an operation mode is a first mode or a second mode, both of the first mode and the second mode relating to processing of the normal print job; and
   a control unit that controls:
   an identification information reception unit that receives user identification information;
   an image forming unit that forms an image based on the received print job:
   a normal print job storage unit that stores the normal print job received from outside;
   an authentication print job storage unit that stores the authentication print job received from the outside;
   a job cancellation instruction reception unit that receives an instruction to cancel the normal print job stored in the normal print job storage unit and the instruction to cancel the authentication print job stored in the authentication print job storage unit;
   a job cancellation processing unit that cancels the normal print job and the authentication print job according to the instruction received by the job cancellation instruction reception unit; and a log creation unit, wherein when the determination unit determines that the received print job is the authentication print job, the control unit executes authentication print processing based on the received authentication print job, wherein when the determination unit determines that the received print job is the normal print job, and in a case where the operation mode determined by the mode management unit is the first mode, the control unit executes normal print processing based on the received normal print job;

wherein when the determination unit determines that the received print job is the normal print job, and in the case where the operation mode determined by the mode management unit is the second mode, the control unit executes the authentication print processing based on the received normal print job;

wherein when the control unit detects identification information indicating the authentication print job in the received print job, the control unit determines that the received print job is the authentication print job;

wherein the control unit compares user identification information received by an identification information reception unit and the user identification information included in the received print job;

wherein when the user identification information received by the identification information reception unit and the user identification information included in the received print job coincide with each other, the control unit causes the image forming unit to form the image based on the received print job;

wherein when the user identification information received by the identification information reception unit and the user identification information included in the received print job do no coincide with each other, the control unit restricts the image forming unit from image formation based on the received print job;

wherein the control unit executes the normal print processing by causing the image forming unit to form the image based on the received print job without executing comparison of the user identification information;

wherein when the determination unit determines that the received print job is the normal print job, and in the case where the operation mode determined by the mode management unit is the second mode, the control unit stores the received normal print job in the normal print job storage unit, and executes the authentication print processing by comparing the user identification information received by the identification information reception unit and the user identification information included in the received normal print job stored in the normal print job storage unit;

wherein when the determination unit determines that the received print job is the normal print job, and in the case where the operation mode determined by the mode management unis is the first mode, the control unit executes the normal print processing without storing the received normal print job;

wherein when the determination unit determines that the received print job is the authentication print job, the control unit stores the received authentication print job in the authentication print job storage unit, and executes the authentication print processing by comparing the user identification information received by the identification information reception unit and the user identification information included in the received authentication print job stored in the authentication print job storage unit, irrespective of whether the operation mode is the first mode or the second mode;

wherein when the job cancellation instruction reception unit receives the instruction to cancel the normal print job, the log creation unit creates a log regarding cancellation of the normal print job; and wherein when the job cancellation instruction reception unit receives the instruction to cancel the authentication print job, the log creation unit does not create the log regarding cancellation of the authentication print job.

2. The image processing apparatus according to claim 1, wherein the control unit has a normal print job storage list including information on the stored normal print job, and an authentication print job storage list including information on the stored authentication print job, and wherein the control unit searches the normal print job storage list and the authentication print job storage list using the user identification information received by the identification information reception unit.

3. The image processing apparatus according to claim 1, wherein the control unit cancels the received print job based on information on a job cancellation time included in the received print job and an elapsed time after the print job is received.

4. The image processing apparatus according to claim 1, wherein the image processing apparatus further includes a cancel notification processing unit that sends a notification to an address included in the print job when the control unit cancels the print job.

5. An image processing system comprising the image processing apparatus according to claim 1.

6. The image processing system according to claim 5, wherein the control unit has a normal print job storage list including information on the stored normal print job, and an authentication print job storage list including information on the stored authentication print job, the normal print job storage list and the authentication print job storage list being separately provided.

7. The image processing system according to claim 6, wherein the control unit cancels the received normal print job based on each of a job cancellation time included in the received normal print job, the user identification information of a user who creates the normal print job also included therein, and an elapsed time after the normal print job is received, and wherein the control unit does not cancel the received authentication print job based on the elapsed time after the authentication print job is received.

8. The image processing system according to claim 5, wherein the determination unit determines whether the print job received from outside is the authentication print job having the instruction to execute authentication print processing, or the normal print job having the user identification information of a user who creates the normal print job.

9. The image processing system according to claim 5, wherein the information processing apparatus comprises:

an information processing control unit that receives setting of a job cancellation time and creates information on the job cancellation time, the information processing control unit creating a print job including the information on the job cancellation time, the user identification information and the image data, the information processing control unit sending the print job to the image processing apparatus, wherein the control unit of the image processing apparatus cancels the received print job based on the information on the job cancellation time included in the received print job and an elapsed time after the print job is received.

10. The image processing system according to claim 9, wherein the print job created by the information processing control unit further includes address information of the information processing apparatus, and
wherein the image processing apparatus further includes a cancel notification processing unit that sends a notification to the address included in the print job when the control unit cancels the print job.

11. The image processing apparatus according to claim 1, wherein the determination unit determines whether the print job received from outside is the authentication print job having the instruction to execute the authentication print processing or the normal print job having the user identification information of a user who creates the normal print job.

12. The image processing apparatus according to claim 1, wherein the control unit has a normal print job storage list including information on the stored normal print job, and an authentication print job storage list including information on the stored authentication print job, the normal print job storage list and the authentication print job storage list being separately provided.

13. The image processing apparatus according to claim 12, wherein the control unit cancels the received normal print job based on each of a job cancellation time included in the received normal print job, user identification information of a user who creates the normal print job also included therein, and an elapsed time after the normal print job is received, and
wherein the control unit does not cancel the received authentication print job based an elapsed time after the authentication print job is received.

14. The image processing apparatus according to claim 1, wherein the normal print job includes the user identification information.

15. The image processing apparatus according to claim 1, wherein the image processing apparatus is connected to the outside via a network, and performs processing based on the print job received from the outside via the network.

16. An image processing apparatus comprising:
a processor, that performs processing operations of:
a determination unit that determines whether a print job received from outside is a normal print job or an authentication print job;
a mode management unit that determines whether an operation mode is a predetermined mode or not;
a control unit that controls:
a job cancellation instruction reception unit that receives an instruction to cancel the normal print job stored in a normal print job storage unit and the instruction to cancel the authentication print job stored in an authentication print job storage unit;
a job cancellation processing unit that cancels the print job according to the instruction received by the job cancellation instruction reception unit; and
a log creation unit that creates a log regarding cancellation of the print job;
wherein when the determination unit determines that the received print job is the authentication print job, the control unit executes authentication print processing based on the received authentication print job,
wherein when the mode management unit determines that the operation mode is the predetermined mode, and when the determination unit determines that the received print job is the normal print job, the control unit executes the authentication print processing based on the receive normal print job instead of executing normal print processing,
wherein when the job cancellation instruction reception unit receives the instruction to cancel the normal print job, the log creation unit creates the log regarding cancellation of the normal print job, and
wherein when the job cancellation instruction reception unit receives the instruction to cancel the authentication print job, the log creation unit does not create the log regarding cancellation of the authentication print job.

* * * * *